US007133737B2

(12) United States Patent
Miyanaga et al.

(10) Patent No.: US 7,133,737 B2
(45) Date of Patent: Nov. 7, 2006

(54) PROGRAM FOR CONTROLLING LASER APPARATUS AND RECORDING MEDIUM FOR RECORDING PROGRAM FOR CONTROLLING LASER APPARATUS AND CAPABLE OF BEING READ OUT BY COMPUTER

(75) Inventors: Akiharu Miyanaga, Kanagawa (JP); Kyouichi Mukao, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

(21) Appl. No.: 10/305,361

(22) Filed: Nov. 27, 2002

(65) Prior Publication Data
US 2003/0153999 A1 Aug. 14, 2003

(30) Foreign Application Priority Data
Nov. 30, 2001 (JP) ............................. 2001-367989

(51) Int. Cl.
*G06F 19/00* (2006.01)
*H01L 21/46* (2006.01)

(52) U.S. Cl. .................. 700/166; 700/28; 700/104; 216/65; 438/463

(58) Field of Classification Search ............... 700/28, 700/48, 50, 104, 121, 166, 182; 216/65, 216/94; 438/463, 487, 535, 662; 117/44, 117/92, 103; 148/97
See application file for complete search history.

(56) References Cited

U.S. PATENT DOCUMENTS

| 4,177,372 A | 12/1979 | Kotera et al. |
|---|---|---|
| 4,316,074 A | 2/1982 | Daly |
| 4,330,363 A | 5/1982 | Biegesen et al. |
| 4,370,175 A | 1/1983 | Levatter |
| 4,388,145 A | 6/1983 | Hawkins et al. |
| 4,406,709 A | 9/1983 | Celler et al. |
| 4,409,724 A | 10/1983 | Tasch, Jr. et al. |
| 4,554,823 A | 11/1985 | Lilley |
| 4,566,043 A | 1/1986 | Tamura |
| 4,592,799 A | 6/1986 | Hayafuji |
| 4,658,135 A | 4/1987 | Allman et al. |
| 4,668,089 A | 5/1987 | Oshida et al. |
| 4,692,191 A | 9/1987 | Maeda et al. |
| 4,780,590 A | 10/1988 | Griner et al. |

(Continued)

FOREIGN PATENT DOCUMENTS

EP 0 088 004 A2 9/1983

(Continued)

OTHER PUBLICATIONS

James S. Im et al., "On the super lateral growth phenomenon observed in excimer laser-induced crystallization of thin Si films", Appl. Phys. Lett., 64(17), Apr. 25, 1994, pp. 2303-2305.

(Continued)

*Primary Examiner*—Jayprakash N. Gandhi
(74) *Attorney, Agent, or Firm*—Nixon Peabody LLP; Jeffrey L. Costellia

(57) ABSTRACT

The object of the present invention is to solve problems treatment time when using an SLS method or continuous-oscillation laser. An indispensable portion is scanned with a laser beam in order to crystallize a semiconductor film by driving a laser and so on in accordance with the positions of islands instead of scanning and irradiating the whole semiconductor film. The present invention makes it possible to omit the time for irradiating a portion to be removed through patterning after crystallizing the semiconductor film with a laser beam and greatly shorten the treatment time for one substrate.

25 Claims, 17 Drawing Sheets

U.S. PATENT DOCUMENTS

| | | | |
|---|---|---|---|
| 4,861,964 A | 8/1989 | Sinohara | |
| 4,978,970 A | 12/1990 | Okazaki | |
| RE33,947 E | 6/1992 | Shinohara | |
| 5,147,826 A | 9/1992 | Liu et al. | |
| 5,214,001 A | 5/1993 | Ipposhi et al. | |
| 5,225,886 A | 7/1993 | Koizumi et al. | |
| 5,246,870 A | 9/1993 | Merchant | |
| 5,275,851 A | 1/1994 | Fonash et al. | |
| 5,294,555 A | 3/1994 | Mano et al. | |
| 5,306,584 A | 4/1994 | Palmer | |
| 5,315,101 A | 5/1994 | Hughes et al. | |
| 5,365,875 A | 11/1994 | Asahi et al. | |
| 5,367,392 A | 11/1994 | Janai | |
| 5,403,772 A | 4/1995 | Zhang et al. | |
| 5,409,867 A | 4/1995 | Asano | |
| 5,432,122 A | 7/1995 | Chae | |
| 5,466,958 A | 11/1995 | Kakumu | |
| 5,488,000 A | 1/1996 | Zhang et al. | |
| 5,488,005 A | 1/1996 | Han et al. | |
| 5,517,312 A | 5/1996 | Finarov | |
| 5,521,107 A | 5/1996 | Yamazaki et al. | |
| 5,528,056 A | 6/1996 | Shimada et al. | |
| 5,529,630 A | 6/1996 | Imahashi et al. | |
| 5,529,937 A | 6/1996 | Zhang et al. | |
| 5,543,636 A | 8/1996 | Yamazaki | |
| 5,563,427 A | 10/1996 | Yudasaka et al. | |
| 5,569,610 A | 10/1996 | Zhang et al. | |
| 5,580,801 A | 12/1996 | Maegawa et al. | |
| 5,591,668 A | 1/1997 | Maegawa et al. | |
| 5,592,318 A | 1/1997 | Majima et al. | |
| 5,604,360 A | 2/1997 | Zhang et al. | |
| 5,608,232 A | 3/1997 | Yamazaki et al. | |
| 5,618,741 A | 4/1997 | Young et al. | |
| 5,620,906 A | 4/1997 | Yamaguchi et al. | |
| 5,625,473 A | 4/1997 | Kondo et al. | |
| 5,632,915 A | 5/1997 | Schnetzer et al. | |
| 5,643,826 A | 7/1997 | Ohtani et al. | |
| 5,656,825 A | 8/1997 | Kusumoto et al. | |
| 5,679,588 A | 10/1997 | Choi et al. | |
| 5,696,003 A | 12/1997 | Makita et al. | |
| 5,698,882 A | 12/1997 | Park | |
| 5,708,252 A | 1/1998 | Shinohara et al. | |
| 5,712,191 A | 1/1998 | Nakajima et al. | |
| 5,736,751 A | 4/1998 | Mano et al. | |
| 5,761,381 A * | 6/1998 | Arci et al. | 706/13 |
| 5,795,816 A | 8/1998 | Teramoto et al. | |
| 5,803,965 A | 9/1998 | Yoon | |
| 5,804,471 A | 9/1998 | Yamazaki et al. | |
| 5,815,494 A | 9/1998 | Yamazaki et al. | |
| 5,821,137 A | 10/1998 | Wakai et al. | |
| 5,824,574 A | 10/1998 | Yamazaki et al. | |
| 5,851,862 A | 12/1998 | Ohtani et al. | |
| 5,854,803 A | 12/1998 | Yamazaki et al. | |
| 5,886,320 A | 3/1999 | Gallo et al. | |
| 5,886,366 A | 3/1999 | Yamazaki et al. | |
| 5,891,764 A | 4/1999 | Ishihara et al. | |
| 5,923,962 A | 7/1999 | Ohtani et al. | |
| 5,937,282 A | 8/1999 | Nakajima et al. | |
| 5,940,690 A | 8/1999 | Kusumoto et al. | |
| 5,943,593 A | 8/1999 | Noguchi et al. | |
| 5,953,597 A | 9/1999 | Kusumoto et al. | |
| 5,980,088 A | 11/1999 | Iwasaki et al. | |
| 5,986,306 A | 11/1999 | Nakajima et al. | |
| 6,020,224 A * | 2/2000 | Shimogaichi et al. | 438/158 |
| 6,043,453 A | 3/2000 | Arai | |
| 6,059,873 A | 5/2000 | Yamaguchi et al. | |
| 6,066,516 A | 5/2000 | Miyasaka | |
| 6,071,765 A | 6/2000 | Noguchi et al. | |
| 6,136,632 A | 10/2000 | Higashi | |
| 6,149,988 A | 11/2000 | Shinohara et al. | |
| 6,169,292 B1 | 1/2001 | Yamazaki et al. | |
| 6,174,374 B1 | 1/2001 | Zhang et al. | |
| 6,176,922 B1 | 1/2001 | Aklufi | |
| 6,177,301 B1 * | 1/2001 | Jung | 438/150 |
| 6,204,099 B1 | 3/2001 | Kusumoto et al. | |
| 6,210,996 B1 | 4/2001 | Yamazaki et al. | |
| 6,221,701 B1 | 4/2001 | Yamazaki | |
| 6,242,289 B1 | 6/2001 | Nakajima et al. | |
| 6,256,849 B1 | 7/2001 | Kim | |
| 6,261,856 B1 | 7/2001 | Shinohara et al. | |
| 6,265,745 B1 | 7/2001 | Kusumoto et al. | |
| 6,285,042 B1 | 9/2001 | Ohtani et al. | |
| 6,322,625 B1 | 11/2001 | Im | |
| 6,335,541 B1 | 1/2002 | Ohtani et al. | |
| 6,337,232 B1 | 1/2002 | Kusumoto et al. | |
| 6,363,296 B1 | 3/2002 | Schulze | |
| 6,365,933 B1 | 4/2002 | Yamazaki et al. | |
| 6,372,039 B1 | 4/2002 | Okumura et al. | |
| 6,373,870 B1 | 4/2002 | Yamazaki et al. | |
| 6,393,042 B1 | 5/2002 | Tanaka | |
| 6,396,616 B1 | 5/2002 | Fitzer et al. | |
| 6,437,284 B1 | 8/2002 | Okamoto et al. | |
| 6,449,123 B1 | 9/2002 | Tsujimoto et al. | |
| 6,468,842 B1 | 10/2002 | Yamazaki et al. | |
| 6,469,729 B1 | 10/2002 | Ryan | |
| 6,475,872 B1 | 11/2002 | Jung | |
| 6,479,329 B1 | 11/2002 | Nakajima et al. | |
| 6,487,307 B1 | 11/2002 | Hennessey et al. | |
| 6,489,188 B1 | 12/2002 | Jung | |
| 6,516,009 B1 | 2/2003 | Tanaka | |
| 6,521,492 B1 * | 2/2003 | Miyasaka et al. | 438/166 |
| 6,524,977 B1 | 2/2003 | Yamazaki et al. | |
| 6,556,652 B1 | 4/2003 | Mazor et al. | |
| 6,558,991 B1 | 5/2003 | Yamazaki et al. | |
| 6,563,077 B1 | 5/2003 | Im | |
| 6,573,163 B1 | 6/2003 | Voutsas et al. | |
| 6,573,919 B1 * | 6/2003 | Benear et al. | 347/116 |
| 6,576,919 B1 * | 6/2003 | Yoshida | 250/548 |
| 6,577,380 B1 | 6/2003 | Sposili et al. | |
| 6,583,381 B1 * | 6/2003 | Duignan | 219/121.69 |
| 6,590,230 B1 | 7/2003 | Yamazaki et al. | |
| 6,590,698 B1 | 7/2003 | Ohtsuki et al. | |
| 6,599,788 B1 | 7/2003 | Kawasaki et al. | |
| 6,602,744 B1 | 8/2003 | Ino et al. | |
| 6,642,091 B1 | 11/2003 | Tanabe | |
| 6,657,154 B1 | 12/2003 | Tanabe et al. | |
| 6,660,085 B1 | 12/2003 | Hara et al. | |
| 6,662,063 B1 * | 12/2003 | Hunter et al. | 700/100 |
| 6,677,222 B1 | 1/2004 | Mishima et al. | |
| 6,698,944 B1 | 3/2004 | Fujita | |
| 6,700,096 B1 | 3/2004 | Yamazaki et al. | |
| 6,863,733 B1 | 3/2004 | Tanabe | |
| 6,727,125 B1 | 4/2004 | Adachi et al. | |
| 6,759,628 B1 | 7/2004 | Ino et al. | |
| 6,764,886 B1 | 7/2004 | Yamazaki et al. | |
| 6,822,263 B1 | 11/2004 | Satou et al. | |
| 6,830,617 B1 | 12/2004 | Ohtani et al. | |
| 6,841,797 B1 | 1/2005 | Isobe et al. | |
| 6,861,614 B1 | 3/2005 | Tanabe et al. | |
| 6,893,987 B1 | 5/2005 | Shiota et al. | |
| 2001/0000243 A1 | 4/2001 | Sugano et al. | |
| 2001/0019861 A1 | 9/2001 | Yamazaki et al. | |
| 2001/0038127 A1 | 11/2001 | Yamazaki et al. | |
| 2001/0055830 A1 | 12/2001 | Yoshimoto | |
| 2002/0031876 A1 | 3/2002 | Hara et al. | |
| 2002/0045288 A1 | 4/2002 | Yamazaki et al. | |
| 2002/0047580 A1 | 4/2002 | Kunii et al. | |
| 2002/0054231 A1 | 5/2002 | Masuyuki | |
| 2002/0068391 A1 | 6/2002 | Jung | |
| 2002/0094008 A1 | 7/2002 | Tanaka | |
| 2002/0096680 A1 | 7/2002 | Sugano et al. | |
| 2002/0100937 A1 | 8/2002 | Yamazaki et al. | |
| 2002/0119609 A1 * | 8/2002 | Hatano et al. | 438/164 |
| 2002/0145711 A1 | 10/2002 | Magome et al. | |

| | | |
|---|---|---|
| 2002/0146873 A1 | 10/2002 | Tanaka |
| 2003/0024905 A1 | 2/2003 | Tanaka |
| 2003/0047732 A1 | 3/2003 | Yamazaki et al. |
| 2003/0059990 A1 | 3/2003 | Yamazaki |
| 2003/0075733 A1 | 4/2003 | Yamazaki et al. |
| 2003/0089691 A1 | 5/2003 | Tanaka |
| 2003/0089907 A1 | 5/2003 | Yamaguchi et al. |
| 2003/0112322 A1 | 6/2003 | Tanaka |
| 2003/0136772 A1 | 7/2003 | Yamazaki et al. |
| 2003/0148565 A1 | 8/2003 | Yamanaka |
| 2003/0148594 A1 | 8/2003 | Yamazaki et al. |
| 2003/0153182 A1* | 8/2003 | Yamazaki et al. .......... 438/689 |
| 2003/0153999 A1 | 8/2003 | Miyanaga et al. |
| 2003/0171837 A1 | 9/2003 | Yamazaki et al. |
| 2003/0211714 A1 | 11/2003 | Yamazaki et al. |
| 2003/0215973 A1 | 11/2003 | Yamazaki et al. |
| 2003/0228723 A1 | 12/2003 | Yamazaki et al. |
| 2003/0234395 A1 | 12/2003 | Kokubo et al. |
| 2003/0235971 A1 | 12/2003 | Yamazaki et al. |
| 2004/0040938 A1 | 3/2004 | Yamazaki et al. |
| 2004/0053450 A1 | 3/2004 | Sposili et al. |
| 2004/0053480 A1 | 3/2004 | Tanabe et al. |
| 2004/0060515 A1 | 4/2004 | Tanabe et al. |
| 2004/0106237 A1 | 6/2004 | Yamazaki |
| 2004/0132266 A1 | 7/2004 | Yamazaki et al. |
| 2005/0009251 A1 | 1/2005 | Yamazaki et al. |
| 2005/0037554 A1 | 2/2005 | Ohtani et al. |

FOREIGN PATENT DOCUMENTS

| | | |
|---|---|---|
| EP | 0 488 801 B1 | 6/1992 |
| EP | 0646950 B1 | 4/1995 |
| EP | 1 049 144 A1 | 11/2000 |
| GB | 2 354 111 A | 3/2001 |
| JP | 59-165450 | 9/1984 |
| JP | 59-205761 | 11/1984 |
| JP | 60-245172 | 12/1984 |
| JP | 60-161396 A | 8/1985 |
| JP | 60-245173 | 12/1985 |
| JP | 60-245174 | 12/1985 |
| JP | 61-048976 | 3/1986 |
| JP | 61-071636 | 4/1986 |
| JP | 61-085868 | 5/1986 |
| JP | 61-251115 | 11/1986 |
| JP | 62-104117 | 5/1987 |
| JP | 63-142807 | 6/1988 |
| JP | 01-134345 | 5/1989 |
| JP | 01-154124 | 6/1989 |
| JP | 01-194351 | 8/1989 |
| JP | 02-140915 | 5/1990 |
| JP | 02-181419 | 7/1990 |
| JP | 04-170067 | 6/1992 |
| JP | 04-206970 | 7/1992 |
| JP | 04-282869 | 10/1992 |
| JP | 04-313272 | 11/1992 |
| JP | 05-067785 | 3/1993 |
| JP | 05-090589 | 4/1993 |
| JP | 05-206464 | 8/1993 |
| JP | 05-315278 | 11/1993 |
| JP | 06-163401 | 6/1994 |
| JP | 07-130652 | 5/1995 |
| JP | 07-183540 | 7/1995 |
| JP | 07-193247 | 7/1995 |
| JP | 07-326769 | 12/1995 |
| JP | 08-078329 | 3/1996 |
| JP | 08-195357 | 7/1996 |
| JP | 09-219380 | 8/1997 |
| JP | 09-253879 | 9/1997 |
| JP | 09-270393 | 10/1997 |
| JP | 09-289321 | 11/1997 |
| JP | 10-135468 | 5/1998 |
| JP | 10-135469 | 5/1998 |
| JP | 11-354463 | 12/1999 |
| JP | 2000-068520 | 3/2000 |
| JP | 2001-102373 | 4/2001 |
| JP | 3221724 | 8/2001 |
| JP | 2003-229432 | 8/2003 |

OTHER PUBLICATIONS

Robert S. Sposili et al., "Sequential lateral solidification of thin silicon films on $SiO_2$", Appl. Phys. Lett., 69(19), Nov. 4, 1996, pp. 2864-2866.

AM-LCD '01 "Performance of poly-Si TFTs fabricated by a Stable Scanning CW Laser Crystallization" F. Takeuchi et al.(pp. 251-254).

AM-LCD '01 "Ultra-high Performance Poly-Si TFTs on a Glass by a Stable Scanning CW Laser Lateral Crystallization" A. Hara et al. (pp. 227-230).

Hayzelden et al., Appl. Phys. Lett., "In Situ Transmission Electron Microscopy Studies of Silcide-Mediated Crystallization of Amorphous Silicon", Jan. 13, 1992, (vol. 60/No. 2/pp. 225-227).

Liu et al., Appl. Phys. Lett., "Polycrystalline Silicon Thin Film Transistors on Corning 7059 Glass Substrates Using Short Time, Low-Temperature Processing", May 17, 1993, (vol. 62/No. 20/pp. 2554-2556).

Liu et al., Appl. Phys. Lett., "Selective Area Crystallization of Amorphous Silicon Films by Low-Temperature Rapid Thermal Annealing", Aug. 14, 1989, (vol. 55/No. 7/pp. 660-662).

Caune et al., Applied Surface Science, "Combined CW Laser and Furnace Annealing of Amorphous Si and Ge in Contact With Some Metals", Jan. 1, 1989, (vol. 26/pp. 597-604).

Takeuchi et al., IDMC 2002, "Performance of Poly-Si TFT Using the CW Laser Lateral Crystallization (CLC)", Jan. 1, 2002, (pp. 73-76).

Lee et al., IEDM 94, "ECR Plasma Oxidation Effects on Performance and Stability of Polysilicon Thin Film Transistors", Jan. 1, 1994, (pp. 523-526).

Lee, et al., IEEE Electron Device Letters, "High Performance Low Temperature Polysilicon Thin Film Transistor Using ECR Plasma Thermal Oxide as Gate Insulator", Aug. 1, 1994, (vol. 15/No. 8/pp. 301-303).

Li, et al., IEEE Electron Device Letters, "On the Pseudo-Subthreshold Characteristics of Polycrystalline-Silicon Thin-Film Transistors With Large Grain Size", May 1, 1993, (vol. 14/No. 5/pp. 240-242).

Lin, et al., IEEE Electron Device Letters, "The Impact of Scaling-Down Oxide Thickness on Poly-Si Thin-Film Transistors' I-V Characteristics", Apr. 1, 1994, (vol. 15/No. 4/pp. 138-139).

Kakkad, et al., J. Appl. Phys., "Crystallized Si Film by Low-Temperature Rapid Thermal Annealing of Amorphous Silicon", Mar. 1, 1989, (vol. 65/No. 5/pp. 2069-2072).

Kakkad, et al., Journal of Non-Crystalline Solids, "Low Temperature Selective Crystallization of Amorphous Silicon", Aug. 1, 1989, (vol. 115/pp. 66-68).

Hara, et al., JPN. J. Appl. Phys., "High-Performance Polycrystalline Silicon Thin Film Transistors on Non-Alkali Glass Produced Using Continuous Wave Laser Lateral Crystallization", Mar. 15, 2002, (vol. 41/Part 2/No. 3/pp. L311-L313).

Dvurechenskii, et al., Phys. Stat. Sol., "Transport Phenomena in Amorphous Silicon Doped by Ion Implantation of 3D Metals", Jan. 1, 1986,. (vol. 95/ pp. 635-640).

Hempel et al., Solid State Communications, "Needle-Like Crystallization of Ni Doped Amorphous Silicon Thin Films", Mar. 1, 1993, (vol. 85/ No. 11/ pp. 921-924).

Hara et al., IEDM 2001, "High Performance Poly-Si TFTs on a Glass by a Stable Scanning CW Laser Lateral Crystallization", Jan. 1, 2001, (pp. 747-750).

* cited by examiner $$y = f(x),$$

$$x = \sum_{j=1}^{n} w_j O_j - \theta$$

<FLOW>
(Following operations are started after setting parameters (moving speed and so on).)

1. Start
2. Open each communication ports         (about hundreds of msec.)
3. Alignment         (about several minutes)
4. Transmitting a command for setting an angle (90°) (ID+9000c/rl/f)
        (more than 9 msec.)
5. Moving the angle by 90°         (about several sec.)
6. Command for moving a major axis (+600mm) (@MOVD_600, 100c/rl/f) + (Okc/rl/f) (more than 19 msec.)
7. Moving the major axis by +600mm         (about 800 msec.)
8. Command for moving a minor axis (+100um) (A: 1+100c/rl/f)
        (more than 9 msec.)
9. Moving the minor axis by +100um         (about 100 msec.)
10. Command for moving the major axis (-600mm) (@MOVD_0, 100c/rl/f) + (Okc/rl/f) (more than 17 msec.)
11. Moving the major axis by -600mm         (about 800 msec.)
12. Returning to No. 6 and repeating operations for minutes.
13. Closing all communication ports         (about hundreds of msec.)
14. End

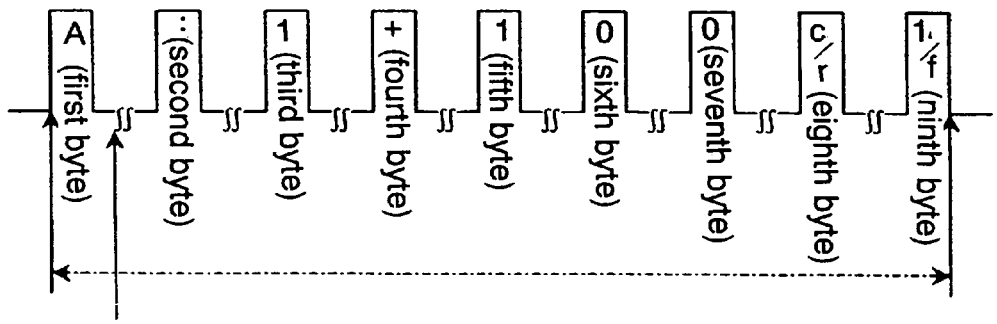

Time change depending on the performance of PC and so on.

FIG. 17

PROGRAM FOR CONTROLLING LASER APPARATUS AND RECORDING MEDIUM FOR RECORDING PROGRAM FOR CONTROLLING LASER APPARATUS AND CAPABLE OF BEING READ OUT BY COMPUTER

BACKGROUND OF THE INVENTION

1. Field of the Invention

The present invention relates to the software for controlling a laser treatment system for crystallizing a semiconductor substrate or semiconductor film by a laser beam or activating the substrate or film after ion-implanting it by a computer or a computer-readable recording medium.

2. Description of the Related Art

As an example of a method of forming the active layer of the thin film transistor (hereinafter, referred to as TFT), there has been developed a technique of forming an amorphous semiconductor film on a substrate having an insulating surface to crystallize the film through a laser annealing method, a thermal annealing method, or the like.

The laser annealing method is known as crystallization technique, which makes it possible to apply high energy only to the amorphous semiconductor film to crystallize the film without significantly increasing a temperature of a glass substrate. In particular, an excimer laser oscillating a light with a short wavelength equal to or less than 400 nm is a typical laser which has been used since an initial stage of development of the laser annealing method. The laser annealing method is performed as follows: a laser beam is processed into a spot or a linear shape on an irradiated surface through an optical system and the processed laser light is scanned over the irradiated surface on the substrate (an irradiation position of the laser light is moved relative to the irradiated surface).

However, in the crystalline semiconductor film formed by the laser annealing method, a plurality of crystal grains aggregate to form the film (a grain size obtained by a conventional excimer laser crystallization method is generally about 0.1 to 0.5 µm) and the crystal grains are arranged randomly in terms of positions and sizes thereof.

An interface of the crystal grains (grain boundary) corresponds to a region where translational symmetry of the crystal is broken up. It is known that this reduces current transportation characteristics of carriers due to an influence of a potential barrier in a recombination center or a trapping center of the carriers or in the grain boundary, which is caused by a crystal defect or the like, and causes an OFF current to increase in the TFT.

The TFT manufactured on the glass substrate is formed while separating the crystalline semiconductor film into island-shaped patterns in order to separate elements. Thus, it is impossible to designate the position and the size of the crystal grain to form the TFT. Therefore, a channel formation region is hardly formed using a single crystalline semiconductor film without influence of a grain boundary.

Here, a technique called a super lateral growth is known, which can provide a large grain size as compared with the grain size in the conventional excimer laser crystallization method. This technique is described in detail in "On the super lateral growth phenomenon observed in excimer laser-induced crystallization of thin Si films, James S. Im and H. J. Kim, Appl. Phys. Lett. 64(17), 25 Apr. 1996, pp. 2303–2305". According to the super lateral growth, the laser light is applied to form a portion where the semiconductor film is completely melted and a portion where a solid-phase semiconductor region remains, and a crystal growth is started with the solid-phase semiconductor region used as a crystal nucleus. It takes some time for the completely melted region to exhibit nucleation, so that until the nucleation is generated in the completely melted region, the crystal is grown in a horizontal direction (hereinafter, as lateral direction) with respect to a film surface of the semiconductor film with the solid-phase semiconductor region used as a crystal nucleus. Thus, the crystal grain grows to such a degree as to make its length several tens of times the film thickness. For example, a lateral crystal growth occurs with a length of 1 µm to 2 µm with respect to a silicon film having a thickness of 600 Å. Hereinafter, this phenomenon is referred to as a super lateral growth.

In the case of the above super lateral growth, a relatively large crystal grain can be obtained, but energy intensity in an energy intensity region of a laser light to realize by the super lateral growth is extremely high as compared with that used in the general excimer laser crystallization. Also, since a range of the energy intensity region is extremely narrow, from a viewpoint of position control of the crystal grain, it is impossible to control positions where the crystal grains having a large grain size are obtained. Further, regions other than the region having the crystal grains with a large grain size become microcrystalline regions where the nucleation occurs in numerous positions or amorphous regions. In the regions, crystal grains are nonuniform in size and surface roughness of the crystal is extremely large. Therefore, an irradiation condition generally used for manufacturing the semiconductor device is a condition such that a uniform grain size of about 0.1 µm to 0.5 µm is easily obtained.

James S. Im et al. disclose a sequential lateral solidification method (hereinafter, SLS method), which can realize the super lateral growth at an arbitrary place under an artificial control (cf. "Sequential lateral solidification of thin silicon films on $SiO_2$, Robert S. Sposili and James S. Im, Appl. Phys. Lett. 69(19), 4 Nov. 1996, pp. 2864–2866"). This SLS method is a method in which an excimer laser light of pulse oscillation is applied onto a sample through a slit-like mask. In this method, the crystallization is performed such that a relative position of the sample and the laser light is shifted by a distance approximately corresponding to a crystal length (about 0.75 µm) obtained by the super lateral growth for each shot and thus, crystal is formed continuously by using the super lateral growth that is artificially controlled.

As described above, according to the SLS method, the crystal grains subjected to the super lateral growth can be formed at an arbitrary place while being artificially controlled. However, it involves the following problems. First, as a first problem, there can be cited poor substrate processing efficiency (throughput). As described above, in the SLS method, crystallization proceeds by a distance of about 1 µm per laser light shot. Therefore, it is necessary to make a relative movement distance (feeding pitch) of a beam spot of the laser light on a sample substrate equal to or less than 1 µm. According to the condition used for the general laser crystallization using the excimer laser of pulse oscillation, the feeding pitch per laser light shot is several tens of µm or more. Needless to say, however, the crystal peculiar to the SLS method cannot be manufactured under the above condition. The SLS method employs a XeCl excimer laser of pulse oscillation whose maximum oscillation frequency is 300 Hz. This only allows a crystallized region to be formed in such a manner that crystallization proceeds by a distance of about 300 µm at maximum per second with respect to a scanning direction of the laser light. With a processing speed at the above level, when the substrate size is enlarged, for example, to 600 mm×720 mm, a large amount of processing time per substrate is required in the conventional SLS method. The fact that a large amount of processing time per substrate is required does not lead to only a problem in terms of time or cost. For example, as pretreatment, a natural oxide film is removed using diluted hydrofluoric acid or the like and then, laser irradiation is performed in some cases. In the substrate surface, the natural oxide film may be regrown in a region subjected to laser irradiation at the end as compared with a region subjected to laser irradiation at the beginning. In this case, amounts of carbon, oxygen, and nitride elements or amounts of contamination impurities such as boron may differ in the substrate surface, these elements being taken in a completed crystal. Further, this may finally cause a variation in characteristics of a transistor in the substrate surface.

As a second problem, there can be cited the optical system that tends to be complicated in the conventional SLS method. It is required to incorporate in the optical system a mask used for processing the laser light into a slit-like shape on the substrate surface. In general, a film thickness of active layer silicon used for a polycrystalline silicon thin film transistor is at least 100 Å. When the excimer laser of pulse oscillation is employed, a laser energy density of at least 200 mJ/cm$^2$ (as a typical example, with respect to an amorphous silicon film having a thickness of 500 Å, about 400 mJ/cm$^2$ in the XeCl excimer laser with a pulse width of 30 nanoseconds) is required for the laser crystallization. In the SLS method, according to an optimum condition of the super lateral growth, a slightly higher energy density region than the above is necessary. It is difficult to manufacture a slit-like mask resistant to such a high laser energy density. In a case of a mask made of metal, when a pulse laser light having a high energy density is applied, the film is locally subjected to an abrupt increase or decrease of temperature. There is concerned, for example, that peeling of the film occurs or a minute pattern shape is broken through a long-term use (in a case of photolithography performing resist exposure, a hard mask material such as chromium is used, but it is used at a low energy density beyond comparison with the laser energy density required for the silicon crystallization, so that there arises no problem concerning peeling of the film, the broken minute pattern shape, or the like). As described above, the conventional SLS method involves the complicated optical system and a factor making device maintenance difficult to perform.

However, in recent years, in crystallization of the semiconductor film, it is found that grain size of the crystal formed in the semiconductor film is larger in the case where the continuous oscillation laser is used than the case where the pulse oscillation laser is used. When the crystal grain size in the semiconductor film becomes large, the mobility of the TFT formed using the semiconductor film becomes high and variation of the TFT characteristics due to a grain boundary is suppressed. Therefore, a continuous oscillation laser is recently attracting attention.

However, since the maximum output energy of the continuous oscillation laser is generally small in comparison with that of the pulse oscillation laser, the size of the beam spot is small, which is about several mm$^2$. Accordingly, in order to treat one large substrate, it is necessary to move a beam irradiation position on the substrate upward and downward, and right and left, it results in increasing the processing time per one substrate. Thus, processing efficiency is poor and it is an important object to improve the processing speed of the substrate.

The object of the present invention is that software technique is used in order to solve the problem of processing substrate time in the case that crystallization of a semiconductor film is carried out using above-mentioned SLS method and the continuous oscillation laser.

SUMMARY OF THE INVENTION

The present invention shortens a substrate treatment time by using a computer and thereby obtaining an optimum control method of a laser treatment drive in accordance with proper laser irradiation information obtained from a combination of CAD (Computer Aided Design) masks for a silicon island, contact, and wiring metal and controlling a laser treatment system in accordance with the obtained laser-treatment-drive control method.

Specifically, the present invention is a program for making a computer function as means for inputting the information on CAD masks for a silicon island, contact, and wiring metal, means for extracting the laser-irradiation information from a combination of the input pieces of information on CAD masks, means for performing the optimization for obtaining an efficient control method of a drive of a laser system (means for obtaining an optimum driving condition of a drive of a laser system), and means for controlling the laser system in accordance with the optimized driving information. To make the computer function as the means for controlling the laser system, the computer is particularly made to function as means for controlling the following four means of the laser system. The following four means are properly controlled: first means for controlling a laser-beam irradiation position on an object to be treated, a plurality of second means for respectively oscillating a laser beam (laser oscillators), third means (optical system) for overlapping beam spots of laser beams oscillated from the laser oscillators on the object to be treated, and fourth means for controlling oscillations of the second means and controlling the first means so that beam spots of the laser beams cover predetermined positions decided in accordance with the data for a mask form (pattern information).

A first configuration of a laser-system control program of the present invention makes a computer function as:

means for a person to input the information on CAD masks for forming a silicon island, contact, and wiring metal on a substrate;

means for automatically extracting the positional information for forming the silicon island on the substrate, the formal information of the silicon island, and the directional information of the source, channel, and drain of the silicon island in accordance with the input information on CAD masks for a silicon island, contact, and wiring metal;

means for obtaining an optimum driving condition of a laser system in accordance with the extracted positional information of the silicon island, formal information of the silicon island, and directional information of the source, channel, and drain of the silicon island; and means for controlling the laser system in accordance with the optimum driving condition of the laser system.

A second configuration of a laser-system control program of the present invention makes a computer function as:

means for a person to input the information on CAD masks for forming a silicon island, contact, and wiring metal on a substrate;

means for automatically extracting the positional information for forming the silicon island on the substrate, the formal information of the silicon island, and the directional information of the source, channel, and drain of the silicon island in accordance with the input information on CAD masks for a silicon island, contact, and wiring metal and storing the information in a database;

means for obtaining an optimum driving condition of a laser system in accordance with the positional information of the silicon island, formal information of the silicon island, and directional information of the source, channel, and drain of the silicon island stored in the database; and means for controlling the laser system in accordance with the optimum driving condition of the laser system.

A third configuration of a laser-system control program of the present invention makes a computer function as: means for a person to input the information on CAD masks for forming a silicon island, a contact, and a wiring metal on a substrate;

means for automatically extracting the positional information for forming the silicon island on the substrate, the formal information on the silicon island, and the directional information on the source, channel, and drain of the silicon island in accordance with the input information on CAD masks of a silicon island, contact, and wiring metal and storing the above information in a database;

means for obtaining an optimum driving condition of a laser system for minimizing the laser treatment time required for the above one substrate by considering the speed of each drive of a laser system and the time required for changing drives of the laser system in accordance with the positional information on the silicon island, formal information on the silicon island, and directional information on the source, channel, and drain of the silicon island stored in the database; and means for controlling the laser system in accordance with the optimum condition of the laser system.

A fourth configuration of a laser-system control program of the present invention makes a computer function as:

means for a person to input the information on CAD masks for forming a silicon island, a contact, and a wiring metal on a substrate;

means for automatically extracting the positional information for forming the silicon island on the substrate, the formal information on the silicon island, and the directional information on the source, channel, and drain of the silicon island in accordance with the input information on CAD masks for a silicon island, contact, and wiring metal and storing the above information in a database;

means for obtaining an optimum driving condition of a laser system for minimizing the laser treatment time required for the above one substrate by considering the speed of each drive of a laser system, the time required for changing drives of the laser system, and the time required for the computer to generate a driving command for each drive and thereafter for each drive to start actual driving in accordance with the positional information on the silicon island, formal information on the silicon island, and directional information on the source, channel, and drain of the silicon island stored in the database; and means for controlling the laser system in accordance with the optimum condition of the laser system.

A fifth configuration of a laser-system control program of the present invention makes a computer function as:

means for a person to input the information on CAD masks for forming a silicon island, a contact, and a wiring metal on a substrate;

means for automatically extracting the positional information for forming the silicon island on the substrate, the formal information on the silicon island, and the directional information on the source, channel, and drain of the silicon island in accordance with the input information on CAD masks for a silicon island, contact, and wiring metal and storing the above information in a database;

means for specifying a region and a direction for a laser beam to scan the surface of a semiconductor film formed on the substrate so as to include at least a region on which the silicon island will be formed in accordance with the positional information on the silicon island, formal information on the silicon island, and directional information on the source, channel, and drain of the silicon island stored in the database;

means for minimizing the laser processing time required for the above one substrate and obtaining an optimum driving condition of a laser system by considering the speed of each drive of a laser system, the time required for changing drives of the laser system, and the time required for the computer to generate a driving command for each drive and thereafter for each drive to start actual driving; and means for controlling the laser system in accordance with the optimum driving condition of the laser system.

Moreover, in the case of the above first to fifth configurations, an optimum driving condition of one of the above laser systems is obtained by using any optimization algorithm among a linear programming method, branch and bound method, neuron circuit network, and annealing method or an evolution-theoretical technique represented by a genetic algorithm.

Furthermore, the present invention is a computer-readable recording medium storing a program for controlling the laser systems having the above features.

A position decided in accordance with mask data denotes a portion of a semiconductor film obtained by crystallizing the portion and thereafter patterning it. In the case of the present invention, the fourth means holds a portion of a semiconductor film formed on an insulating surface left on a substrate after patterned in accordance with a mask. Then, a portion to be scanned with a laser beam is decided so that at least a portion obtained by patterning it can be crystallized to locally crystallize the semiconductor film by controlling the first means so that a beam spot hits the portion to be scanned. That is, in the case of the present invention, a laser beam is applied so that at least an indispensable portion can be crystallized instead of scanning and irradiating the whole semiconductor film with a laser beam. The above configuration makes it possible to omit the time for applying a laser beam to a portion to be removed through patterning after crystallizing a semiconductor film.

Moreover, in the case of the present invention, to realize the above configuration, a marker is put on a semiconductor film with a laser beam before crystallizing the film with the laser beam after forming the semiconductor film. Then, a position to be scanned with the laser beam is decided in accordance with a mask on the basis of the position of the marker.

The above configuration makes it possible to shorten the time required for irradiation with a laser beam and improve the treatment rate of a substrate.

BRIEF DESCRIPTION OF THE DRAWINGS

FIG. 17 is a schema of operation commands.

DESCRIPTION OF THE PREFERRED EMBODIMENTS

Figure 1:
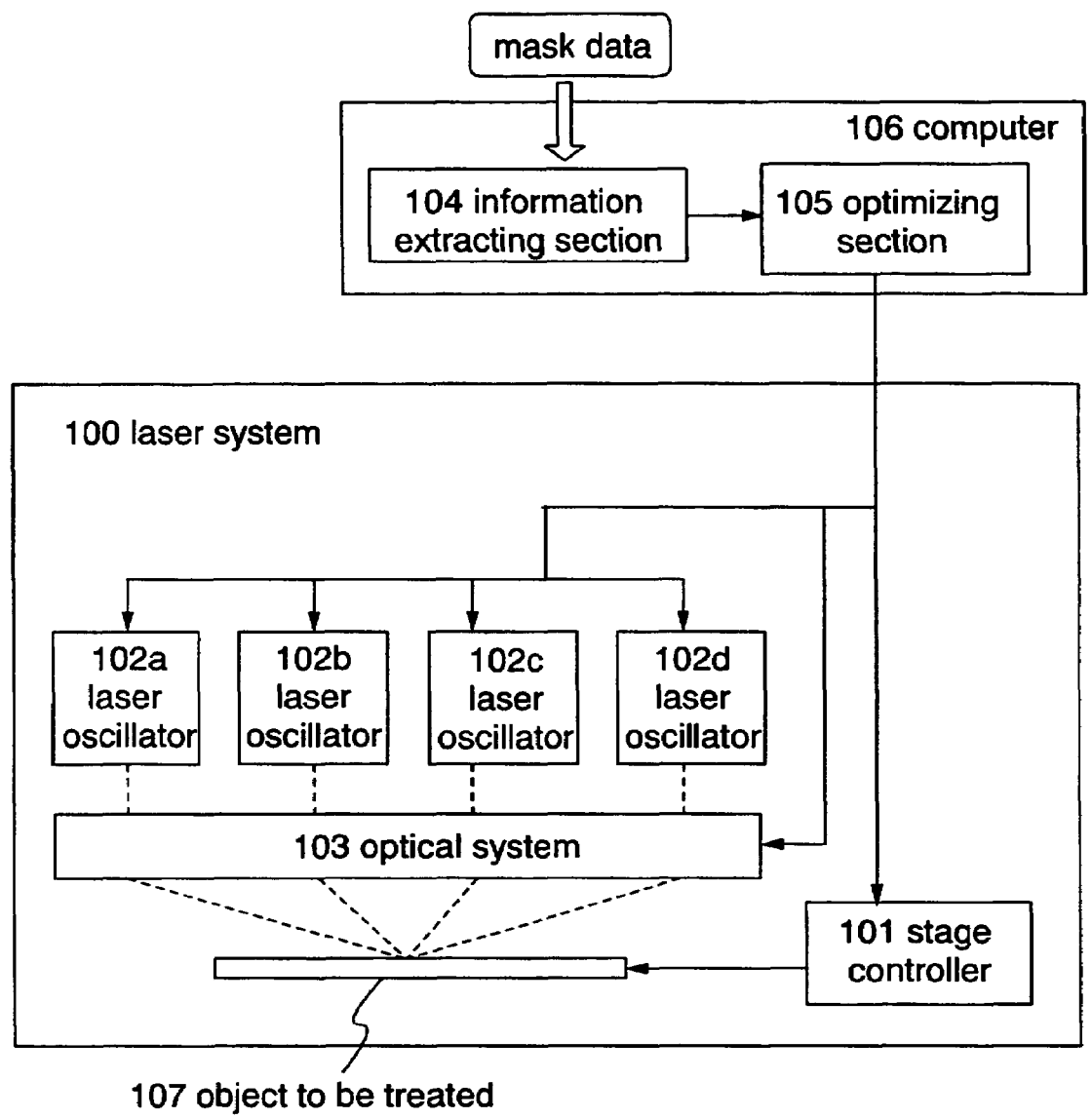
FIG. 1 is an illustration showing a structure of a laser system.

A configuration of a laser system when controlling the laser system in accordance with the present invention is described below by referring to FIG. 1.

A laser system 100 of the present invention has a stage controller 101 corresponding to the first means for controlling a laser-beam-applying position of an object to be treated.

Moreover, the laser system 100 of the present invention has a plurality of laser oscillators 102 (102a to 102d) corresponding to the second means for oscillating a laser beam. FIG. 1 shows a laser system for treating an object to be irradiated with laser beams by overlapping beam spots of laser beams oscillated by four laser oscillators 102a to 102d on the object. However, the number of the laser oscillators 102 of the laser system 100 of the present invention is not restricted to four. It is allowed that the number of laser oscillators 102 of the laser system 100 of the present invention is one or more. In case of using a plurality of laser oscillators 102 and overlapping beam spots of laser beams oscillated from the laser oscillators each other on an object to be irradiated, it is possible to further shorten the treatment time for one substrate. Moreover, it is allowed that all laser oscillators use the same laser and their wavelengths are equal to or different from each other.

It is possible to properly change a laser in accordance with the treatment purpose. It is possible to use a publicly-known laser for the present invention. It is possible to use a continuous-oscillation gas laser or solid laser. The gas laser includes an excimer laser, Ar laser, and Kr laser and the solid laser includes a YAG laser, $YVO_4$ laser, YLF laser, $YAlO_3$ layer, glass laser, ruby laser, alexandrite laser, and Ti:sapphire laser. The solid laser uses a laser using the crystal of YAG, $YVO_4$, YLF, or $YAlO_3$ doped with Cr, Nd, Er, Ho, Ce, Co, Ti, or Tm. The basic wave of the solid laser depends on a doping material and a laser beam having a basic wave of approx. 1 μm is obtained. It is possible to obtain a harmonic for a basic wave by using a nonlinear optical element.

Moreover, an infrared laser beam emitted from a solid laser is converted into a green laser beam by a nonlinear optical element and then, an ultraviolet laser beam obtained by another nonlinear optical element can be used.

It is allowed that a laser system has means for adjusting the temperature of an object to be treated in addition to the above four means.

Moreover, the laser system 100 has an optical system 103 corresponding to the third means capable of overlapping beam spots of laser beams oscillated from the laser oscillators 102a to 102d each other on an object to be treated.

Figure 2:
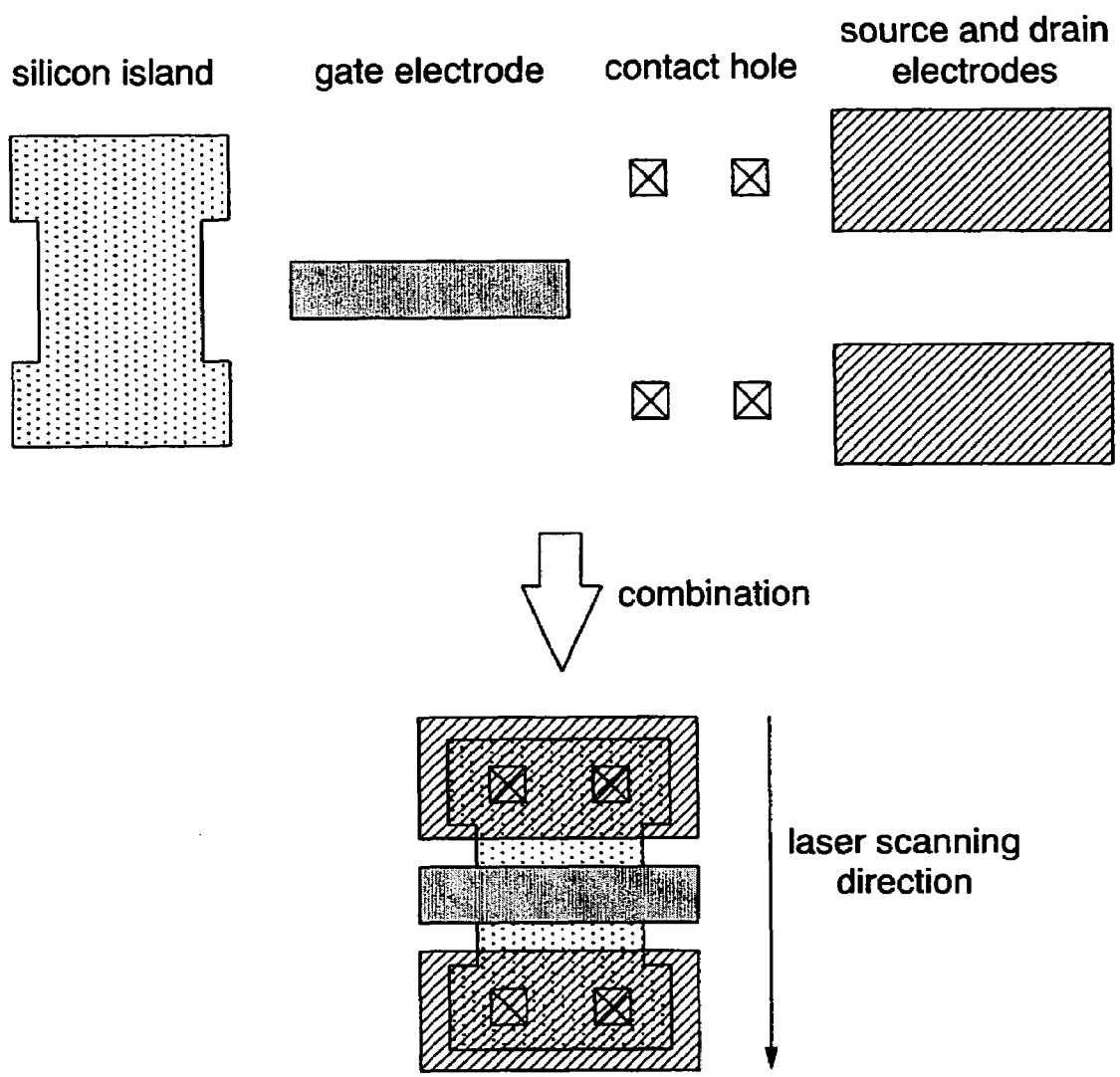
FIG. 2 is an illustration showing a combination of a plurality of mask patterns.

Furthermore, the laser system 100 is controlled by a computer 106 in an optimum condition. The computer 106 has an information extracting section 104 and an optimizing section 105. First, the information on CAD masks for forming a silicon island, contact, and wiring metal on a substrate is input to the information extracting section 104 of the computer 106 and the information extracting section 104 automatically extracts the positional information for forming a silicon island on a substrate, the formal information on the silicon island, and the directional information on the source, channel, and drain of the silicon island from a combination of the input pieces of mask information. FIG. 2 shows a specific image when combining pieces of mask information. It is impossible to extract directions of the source, channel, and drain of the silicon island only from the mask information on the silicon island. However, as shown in FIG. 2, by combining pieces of mask information on a silicon island, gate electrode, contact, and source and drain electrodes, it is possible to extract directions of a source, channel, and drain of the silicon island. To hold the extracted information, the following methods are considered: a method of holding the information by forming it into a database and a method of obtaining the information by converting it into a vector. Because detailed description on the information extracting section will be described later in example 1, it is recommended to refer to the example 1. When driving drives (laser, mirror, slit, and stage) of a laser system, the optimizing section 105 can obtain a most-efficient driving condition (driving condition for minimizing the time required for the whole work) by performing the optimization for minimizing the time required for the whole work (laser treatment time required for one substrate), control oscillations of the laser oscillators 102, and control the stage controller 101 corresponding to first means so that the beam spot of a laser beam covers a position decided in accordance with mask data.

Figure 3A:
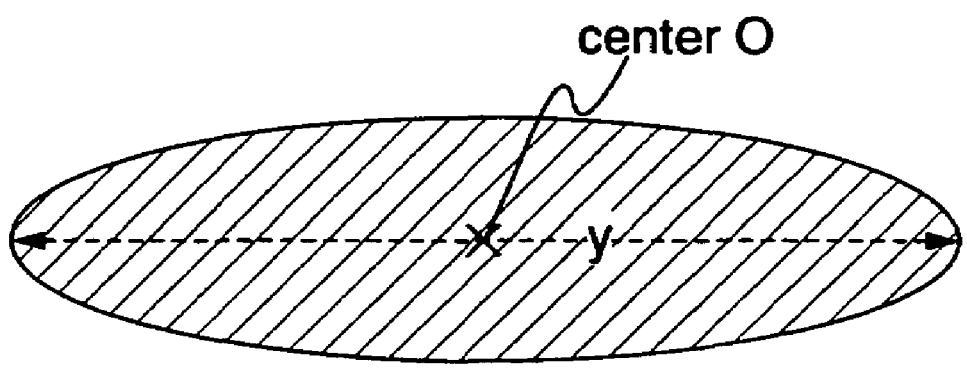
FIGS. 3A and 3B are illustrations showing a shape and a distribution of energy densities of a laser beam.

FIG. 3A shows a shape of a beam spot of one of the laser beams oscillated by the laser oscillators 102a to 102d on an object 107 to be treated shown in FIG. 1. The beam spot shown in FIG. 3A is elliptic. However, a shape of the beam spot of a laser beam oscillated from a laser system of the present invention is not restricted to an ellipse. A shape of a beam spot depends on the type of a laser and it is possible to form the shape of the beam spot by an optical system. For example, the shape of a laser beam emitted from the XeCl excimer laser (wavelength of 308 nm and pulse width of 30 ns) L3308 made by LAMBDA is a rectangle of 10 mm×30 mm (both are half-widths in beam profile). Moreover, the shape of a laser beam emitted from a YAG laser becomes circular when a rod shape is cylindrical or rectangular when it is the slab type. By further forming the above laser beam by an optical system, it is possible to form a laser beam of a desired size.

Figure 3B:
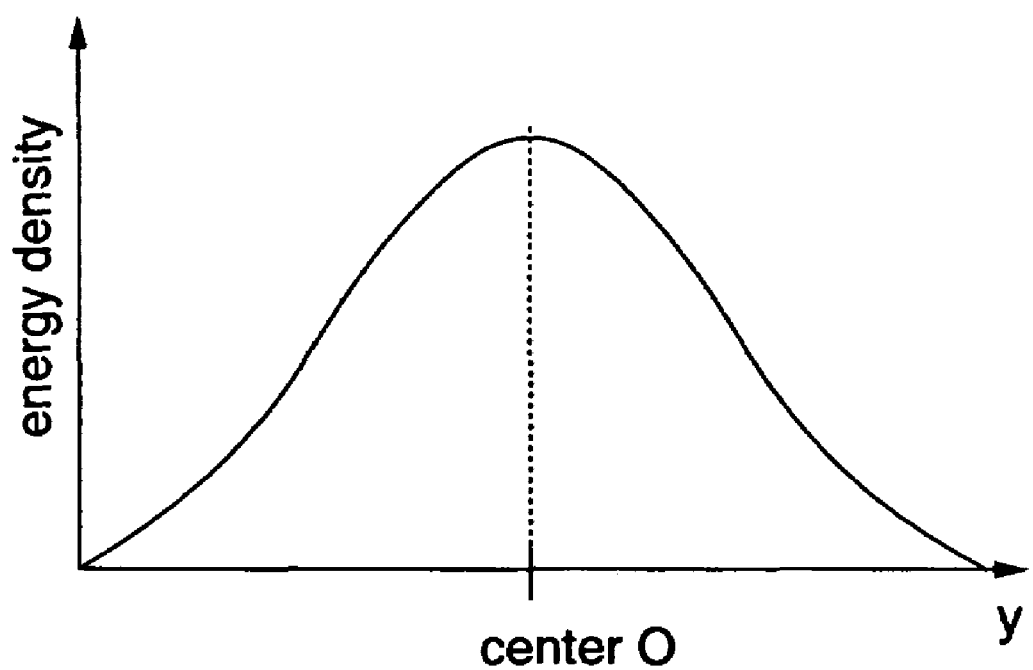

FIG. 3B shows a distribution of energy densities of a laser beam in y-direction of the major axis of the beam spot shown in FIG. 3A. The distribution of energy densities of the laser beam whose beam spot is elliptic becomes higher toward the center O of the ellipse.

Figure 4:
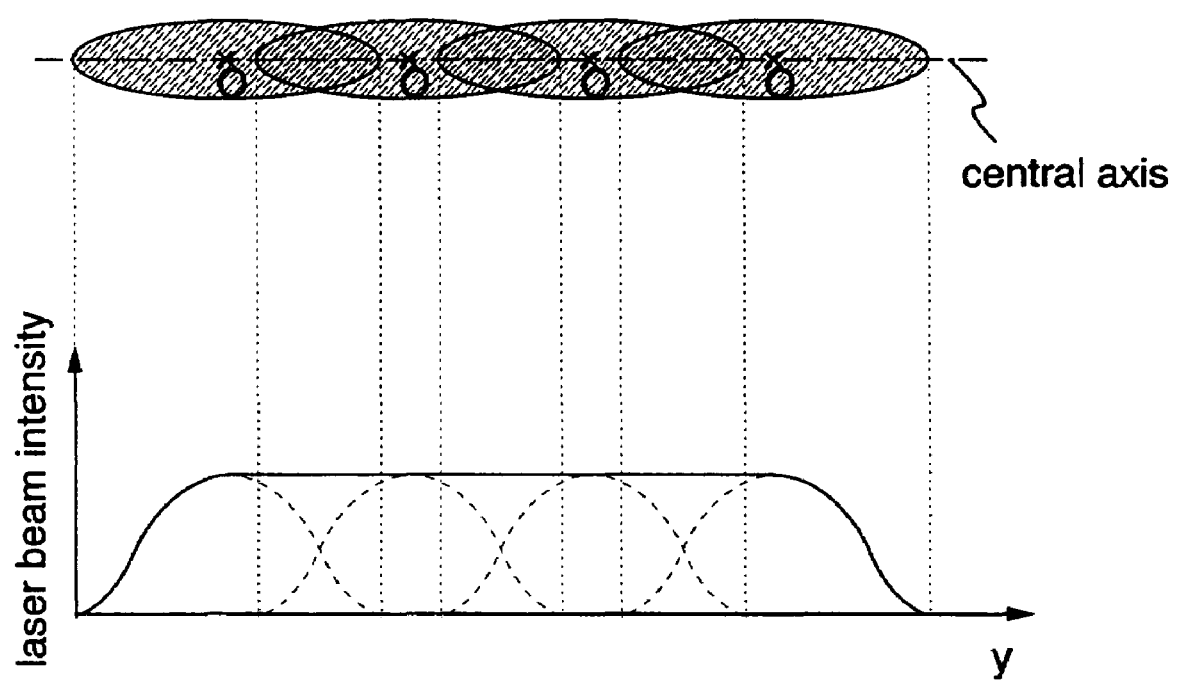
FIG. 4 is an illustration showing a shape and a distribution of energy densities of a laser beam.

The upper part of FIG. 4 shows a shape of a beam spot when synthesizing four laser beams respectively having the beam spot shown in FIG. 3. The information for changing shapes of the beam spot is also based on the information extracted by the information extracting section 104 in FIG. 1. As shown in the upper part of FIG. 4, the beam spots of the laser beams are synthesized by the fact that major axes of the ellipses coincide with each other and parts of the beam spots are overlapped each other and thereby, one beam spot is formed. Hereafter, line formed by combining the center of each ellipse with each other, is called center axis.

The lower part of FIG. 4 shows a distribution of laser-beam energy densities of the synthesized beam spot shown in the upper part of FIG. 4 in the central-axis direction. Because energy densities are added at portions where beam spots before synthesized are overlapped, the energy densities are flattened between centers O of the ellipses.

From the lower part of FIG. 4, it is found that the crystallinity of a semiconductor film can be efficiently improved, compared to the case of independently using a plurality of laser beams without overlapping them by overlapping the laser beams so that low-energy-density portions are compensated for each other.

In the case of the present invention, a portion to be scanned with a laser beam is decided on a semiconductor film formed on a substrate by the information extracting section 104 in FIG. 1 in accordance with a patterning mask for forming a silicon island on the substrate input to the section 104. The portion to be scanned with the laser beam is formed so as to cover a portion obtained by patterning the semiconductor film after crystallized. When a laser scanning direction is decided, it is possible to scan a portion, on which a signal-line driving circuit and a scanning-line driving circuit on a semiconductor film made to fabricate an active-matrix semiconductor device will be formed, at an angle of 90°. The information extracting section 104 delivers extracted information to the optimizing section 105, obtains an efficient method for controlling the stage controller 101, decides a portion to be scanned with a laser beam so that at least a portion of a semiconductor film formed on a substrate obtained by patterning it can be crystallized, and locally crystallizes the semiconductor film so that a beam spot, that is, irradiation position hits the portion to be scanned.

Figure 5:
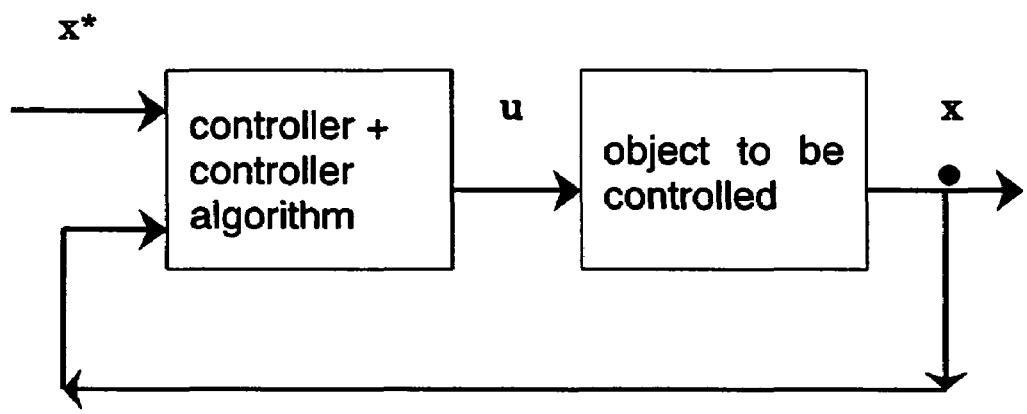
FIG. 5 is an illustration showing an optimization concept.

Then, optimization to be performed by the optimizing section 105 is described below. FIG. 5 shows a schema for the optimization to be formed by the optimizing section 105. First, a reference input vector is captured by a controller and the controller provides a control-operation vector u for a control object in accordance with the reference input vector. The control object operates in accordance with the control-operation vector u and resultantly, an output vector x is output. When the output vector reaches a set value, optimization is completed. However, when the output vector does not reach an optimum value, the output vector is captured by the controller again and the same operation is repeated until the output value becomes the optimum value.

Figure 6A:
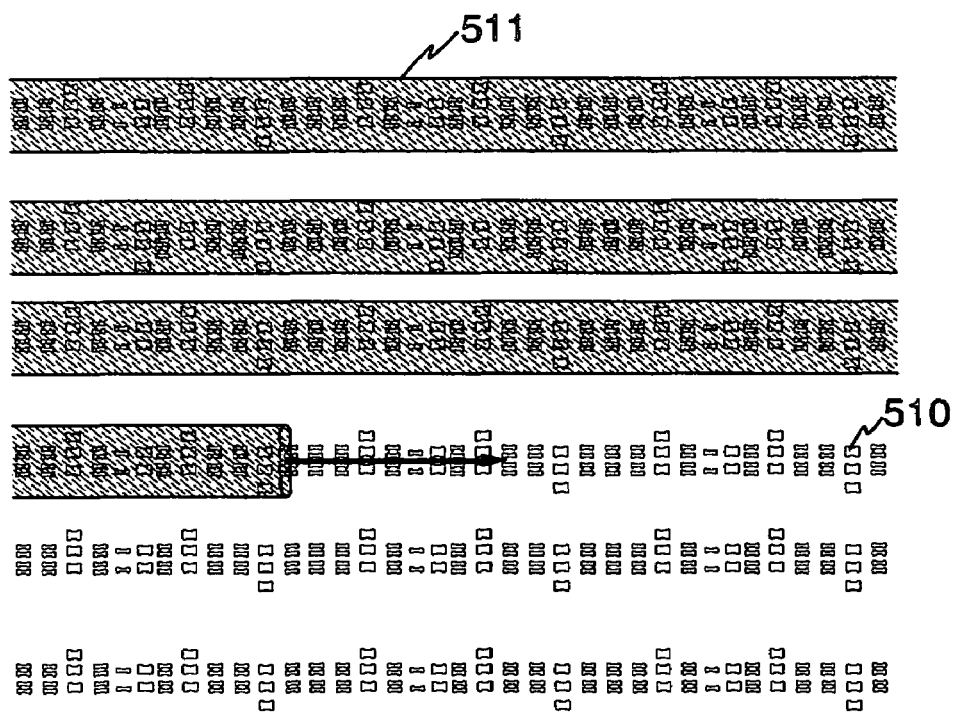
FIGS. 6A and 6B are illustrations showing moving directions of a laser beam on the active layer of a TFT.
Figure 6B:
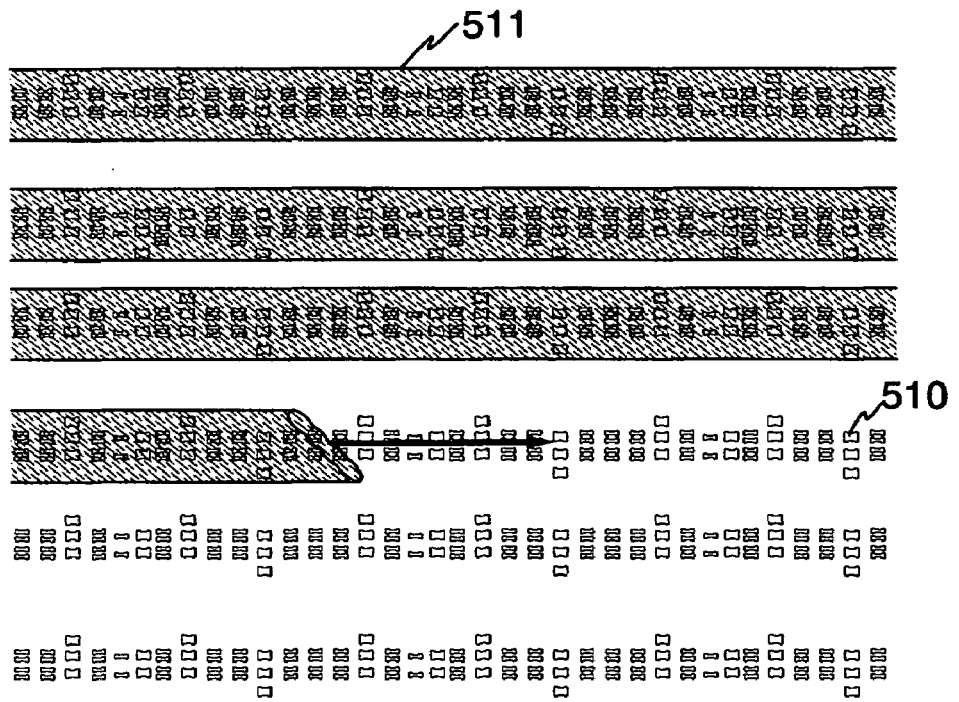

FIG. 6A shows a relation between a portion to be scanned with a laser beam and a mask. In FIG. 6A, the central axis of a beam spot is almost vertical to a scanning direction. FIG. 6B shows a relation between a portion to be scanned with a laser beam and a mask when the central axis of a beam spot tilts from a scanning direction by 45°. Symbol 510 denotes island-shaped semiconductor films obtained through patterning and a portion to be scanned with a laser beam is decided so as to cover these island-shaped semiconductor films 510. Symbol 511 denotes a portion to be scanned with a laser beam, which covers island-shaped semiconductor films 510. As shown in FIGS. 6A and 6B, in the case of the present invention, at least an indispensable portion is scanned with a laser beam so that it can be crystallized instead of irradiating the whole surface of a semiconductor film with the laser beam.

When a crystallized semiconductor film is used as an active layer of a TFT, it is preferable to decide a scanning direction with a laser beam so that it becomes parallel with a direction in which carriers in a channel-forming region move.

Figure 7A:
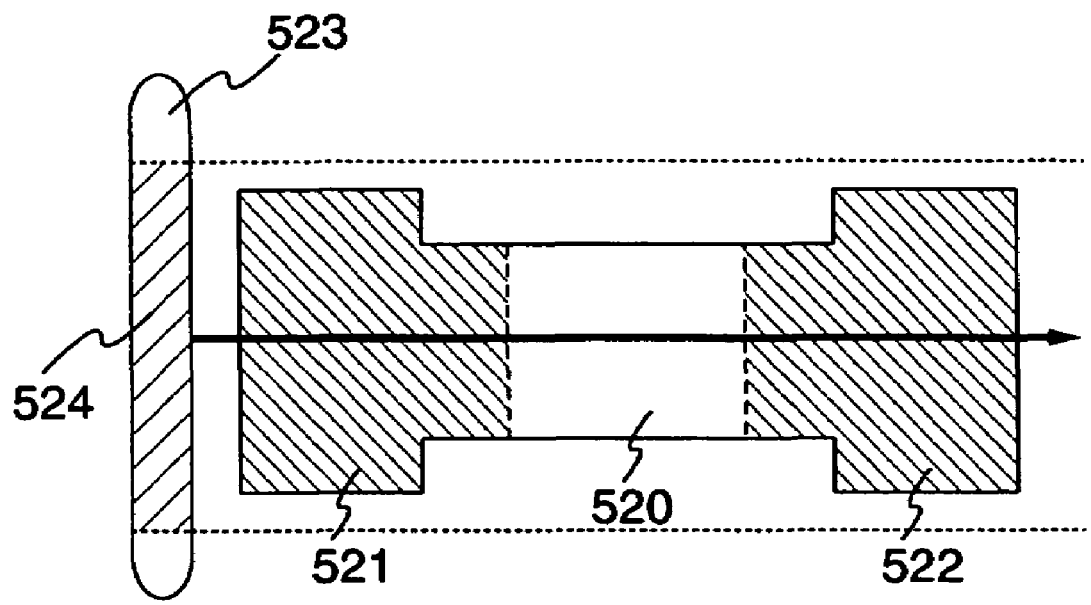
FIGS. 7A and 7B are illustrations showing moving directions of a laser beam on the active layer of a TFT.
Figure 7B:
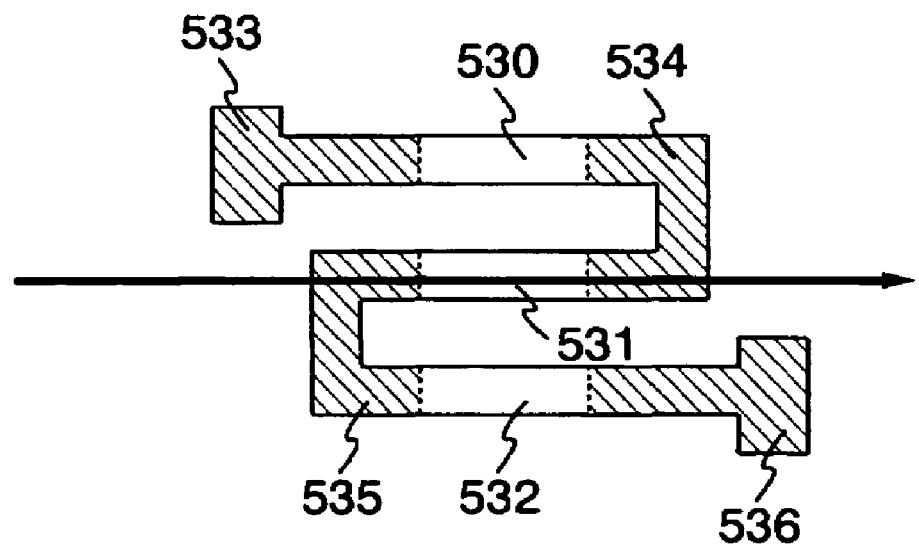

FIGS. 7A and 7B show active layers of a TFT. FIG. 7A shows an active layer on which a channel-forming region is formed, in which impurity regions 521 and 522 serving as source regions or drain regions are formed so as to hold a channel-forming region 520. When crystallizing a semiconductor film by using a laser system of the present invention, a scanning direction of a laser beam is decided so that it becomes parallel with a direction in which carriers in a channel-forming region move as shown by an arrow. Symbol 523 denotes the shape of a beam spot and an energy density required to obtain preferable crystal is satisfied in a region 524. By irradiating the whole active layer with the laser beam in the hatched region 524, it is possible to further improve the crystallinity of the active layer.

Moreover, FIG. 7B shows an active layer on which three channel-forming regions are formed and impurity regions 533 and 534 are formed so as to hold a channel-forming region 530 and moreover, impurity regions 534 and 535 are formed so as to hold a channel-forming region 531. Further, impurity regions 535 and 536 are formed so as to hold a channel-forming region 532. Furthermore, when crystallizing a semiconductor film by using a laser system of the present invention, a scanning direction with a laser beam is decided so that the direction becomes parallel with a direction in which carriers in a channel-forming region move.

Figure 8A:
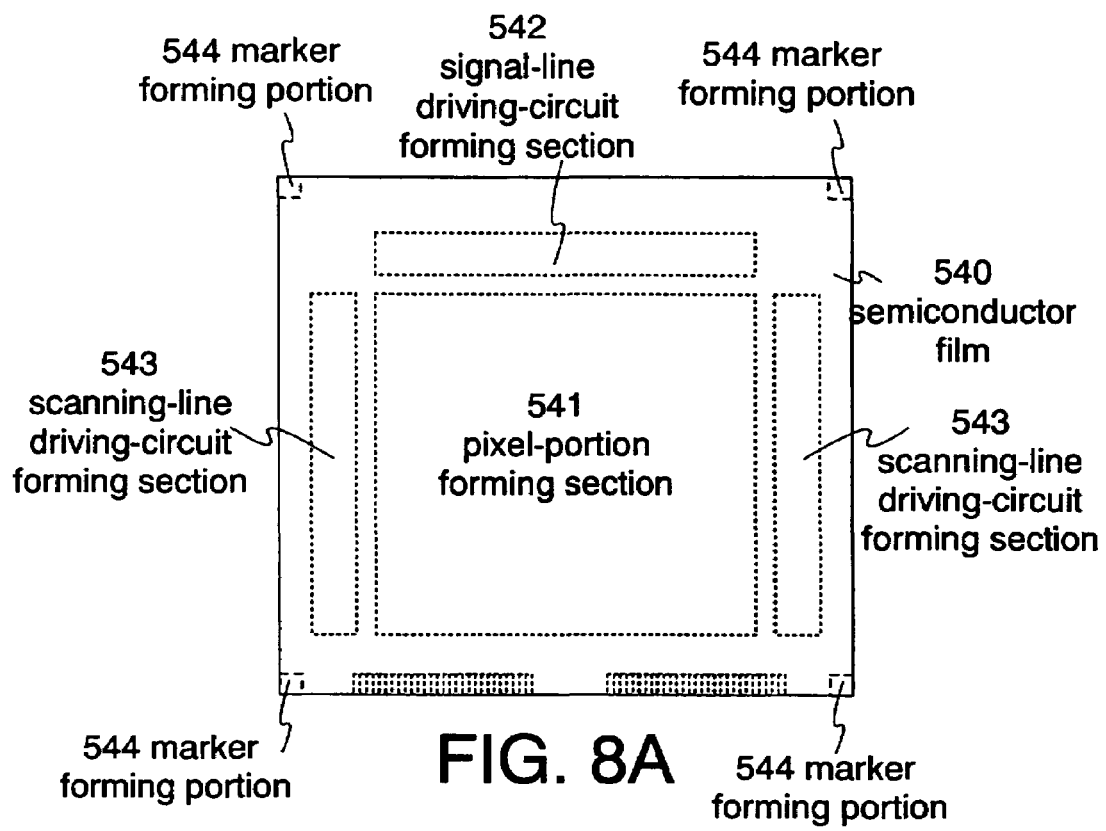
FIGS. 8A and 8B are illustrations showing positions of markers.
Figure 8B:
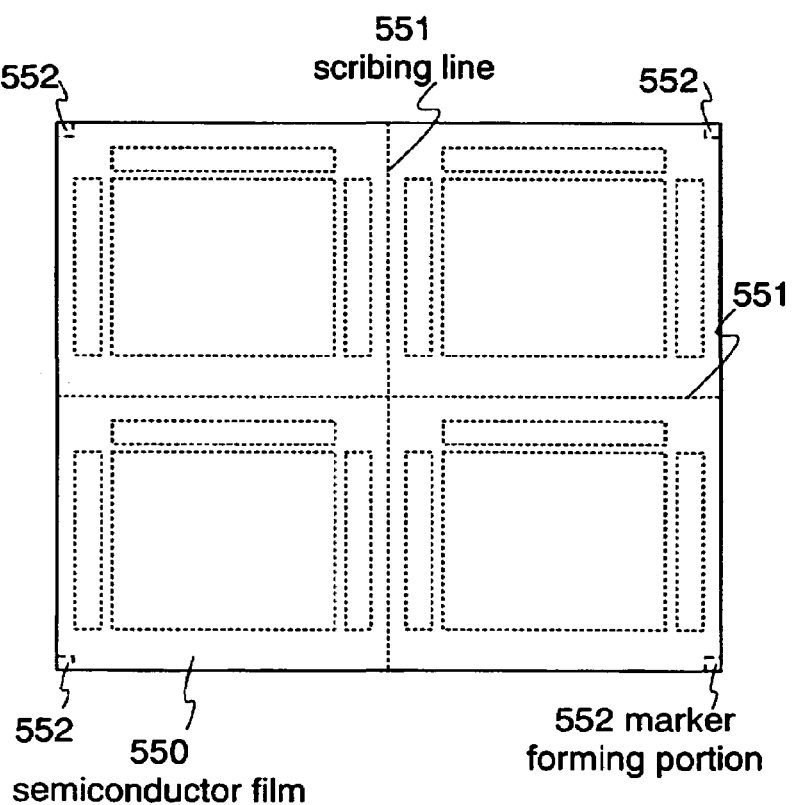

To decide a portion to be scanned with a laser beam, it is necessary to form a marker for deciding the position of a mask on the semiconductor film. FIGS. 8A and 8B respectively show a position for forming a marker on a semiconductor film formed to fabricate an active-matrix semiconductor device. FIG. 8A shows a case of fabricating one semiconductor device from one substrate and FIG. 8B shows a case of fabricating four semiconductor devices from one substrate.

In FIG. 8A, symbol 540 denotes a semiconductor film formed on a substrate, in which a broken line 541 corresponds to a pixel portion, broken line 542 corresponds to a portion on which a signal-line driving circuit will be formed, and broken line 543 corresponds to a portion on which a scanning-line driving circuit will be formed. Symbol 544 denotes a portion (marker forming portion) on which a marker will be formed, which is formed so as to be located at four corners of the semiconductor film.

Though four marker-forming portions 544 are formed at four corners one each in FIG. 8A, the present invention is not restricted to this configuration. As long as a portion to be scanned with a laser beam can be aligned with a semiconductor-film patterning mask, positions of and the number of marker forming portions are not restricted to the above configuration.

In FIG. 8B, symbol 550 denotes a semiconductor film formed on a substrate and a broken line 551 denotes a scribing line for segmenting a substrate in a subsequent step. In FIG. 8B, it is possible to fabricate four semiconductor devices by segmenting a substrate along the scribing line 551. However, the number of semiconductor devices obtained through segmentation is not restricted to four.

Symbol 552 denotes a portion on which a marker will be formed (marker forming portion), which is formed so as to be located at four corners of a semiconductor film. Though four marker-forming portions 552 are formed at four corners each in FIG. 8B, the present invention is not restricted to this configuration. As long as a portion to be scanned with a laser beam can be aligned with a semiconductor-film patterning mask, positions of and the number of marker forming portions are not restricted to the above configuration.

It is simple to form a marker by a laser. A laser for forming a marker can typically use either of a YAG laser and $CO_2$ laser. It is undoubtedly possible to form a marker by a laser other than the above ones.

Then, a production system of a semiconductor device using a laser system of the present invention is described below.

Figure 9:
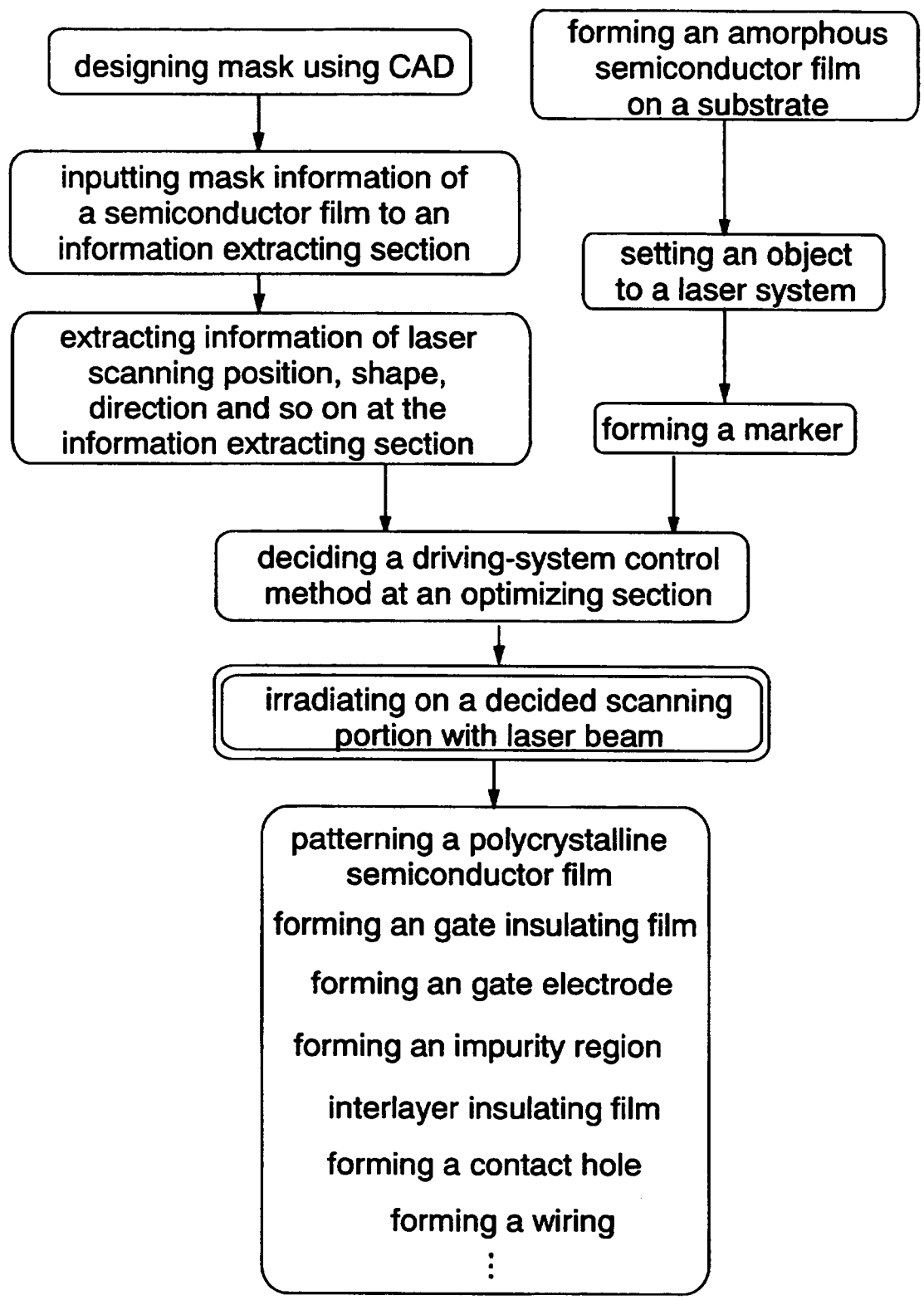
FIG. 9 is a flowchart for a flow of a production system.

FIG. 9 shows a flow of the production system in the form of a flowchart. First, a semiconductor device is designed by using CAD. Then, the information on the shape of a mask for patterning a designed semiconductor film is captured by the information extracting section of the computer 106.

Moreover, after an amorphous semiconductor film is formed on a substrate, the substrate is set to a laser system. Then, a marker is formed on the surface of the semiconductor film by a laser.

The information extracting section 104 decides the information (position, shape, and direction) of a portion to be scanned with a laser beam on the basis of the position of the marker in accordance with the information on the mask captured by the information extracting section 104. The information is captured by the optimizing section 105 and a drive control method (such as sequence) for performing efficient production is obtained by the optimizing section 105. Then, a laser beam is applied to the portion to be scanned with the laser beam extracted by the information extracting section 104 on the basis of a formed marker to locally crystallize a semiconductor film.

Then, after irradiating the portion with the laser beam, a polycrystalline semiconductor film obtained through irradiation with the laser beam is patterned and etched to form an island-shaped semiconductor film. Thereafter, a step of fabricating a TFT from the island-shaped semiconductor film is executed. A specific TFT fabrication step depends on the shape of a TFT. Typically, a gate-insulating film is formed and an impurity region is formed on an island-shaped semiconductor film. Then, a interlayer insulating film is formed so as to cover the gate-insulating film and a gate electrode and a contact hole is formed on the interlayer insulating film to expose a part of the impurity region. Then, a wiring is formed on the interlayer insulating film so as to contact with the impurity region through the contact hole.

Figure 10:
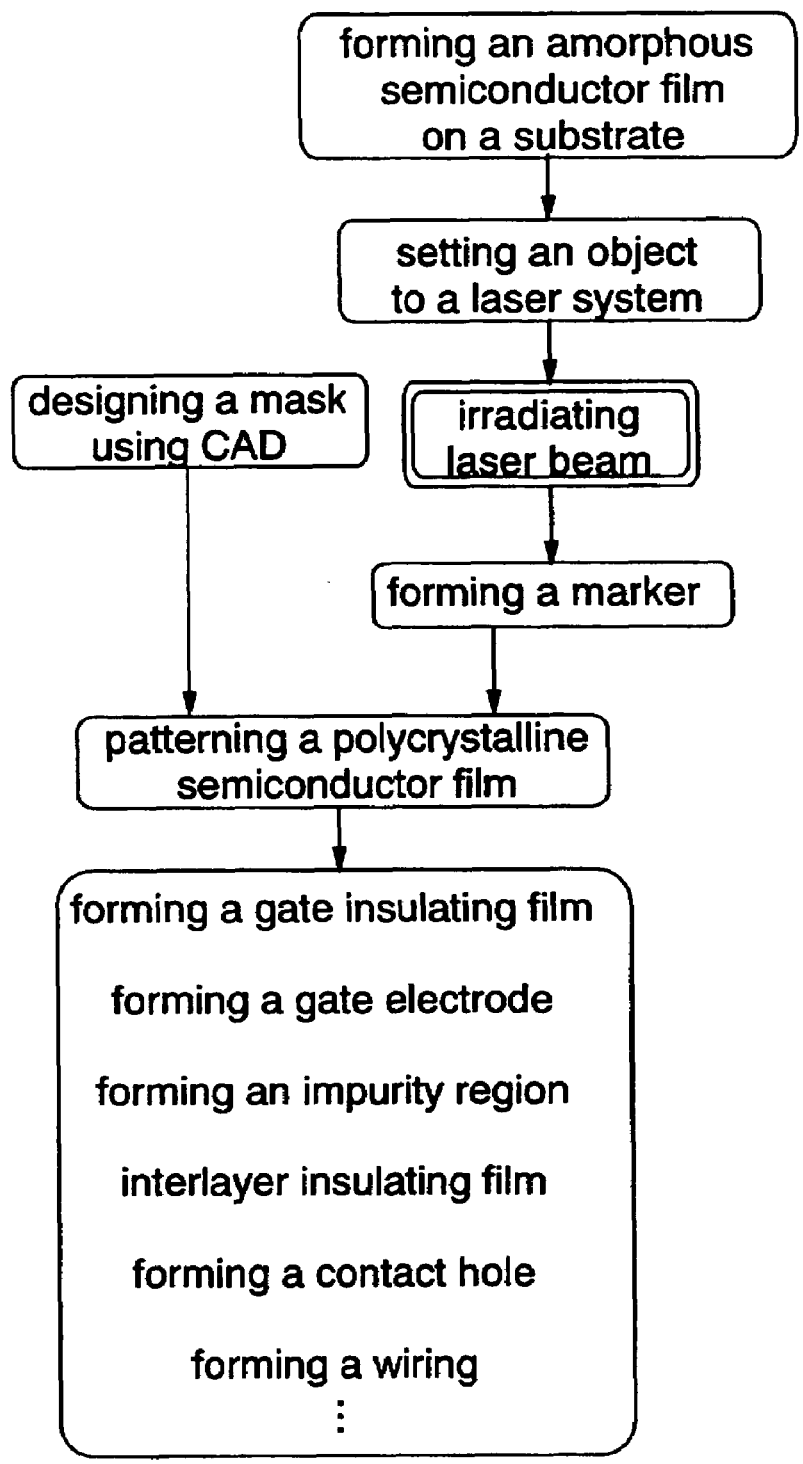
FIG. 10 is a flowchart for a flow of a conventional production system.

FIG. 10 shows a flow of conventional semiconductor-device production in the form of a flowchart for comparison. As shown in FIG. 10, a mask of a semiconductor device is designed through CAD while an amorphous semiconductor film is formed on a substrate and the substrate on which the amorphous semiconductor film is formed is set to a laser system. Then, the amorphous semiconductor film is scanned so that the film is entirely irradiated with a laser beam to crystallize the whole semiconductor film. Then, a marker is formed on the polycrystalline semiconductor film obtained through crystallization and the polycrystalline semiconductor film is patterned on the basis of the marker to form an island-shaped semiconductor film. Then, a TFT is fabricated by using the island-shaped semiconductor film.

Thus, in the production system, a marker is formed before an amorphous semiconductor film is crystallized by a laser beam differently from the conventional case shown in FIG. 10. Then, a laser beam scans the semiconductor film in accordance with the information on a mask for patterning the semiconductor film.

According to the above configuration, it is possible to omit the time for applying the laser beam to a portion to be removed through patterning after crystallizing the semiconductor film. Therefore, it is possible to shorten the time for irradiation with the laser beam and improve the treatment rate of a substrate.

Thus, in the case of the present invention, a laser beam is applied so that at least an indispensable portion can be crystallized instead of applying the laser beam to the whole semiconductor film. According to the above configuration, it is possible to omit the time for applying a laser beam to a portion to be removed through patterning after crystallizing a semiconductor film and greatly shorten the treatment time per substrate.

Moreover, because the width of the trace of a laser beam can be changed, it is possible to prevent the edge of the trace of the laser beam from overlapping with a semiconductor obtained through patterning. Moreover, it is possible to reduce the number of damages to a substrate by applying a laser beam to an unnecessary portion.

EXAMPLES

Examples of the present invention are described below.

Example 1

For this example, the information extracting section 104 of the present invention in FIG. 1 is described.

FIG. 2 shows CAD mask drawings for a silicon island, contact, and wiring metal and a combined mask drawing. It is originally possible to obtain the information on a position and shape to be crystallized by a laser in accordance with only the information on a silicon mask. However, the present system makes it possible to obtain the directional information on the source→channel→drain (or drain→channel→source) of a silicon island by also processing CAD mask drawings of a contact and wiring metal in addition to a CAD mask for a silicon island from the viewpoint of also placing great importance on the difference between transistor characteristics depending on a laser scanning direction.

In the case of a mask drawing, it is possible to obtain the directional information on a silicon island in accordance with the mutual arrangement of CAD mask drawings of the silicon island, a contact, and a wiring metal. Therefore, the directional information on the silicon island is stored in a database together with the positional and formal information on each silicon layer.

As another method for obtaining positional, formal, and directional information on a silicon island, there is a method for obtaining positional, formal, and directional information on a silicon island through operations by providing a CAD mask drawing as vectorized information.

For actual processing, automatic extraction of an information extracting section is particularly effective on a driver portion of a semiconductor. However, a complex silicon layer such as the multigate type is formed on a pixel portion in many cases. Therefore, it is practical to manually input one pattern and capture the pattern as automatic repetitive information by making the most use of the fact that a pixel portion is an aggregate of repetitive patterns.

Example 2

For this example, a method for obtaining a high-working-efficiency condition in accordance with the information obtained by an optimizing section from an information extracting section is described.

It is an object of an optimizing section to optimize a control method by considering the speed of a drive, the time required to change a drive to a different drive, and the time required from generation of a driving command up to actual driving when capturing the position, shape, and size of a silicon island extracted from a combination of CAD masks of the silicon island, a contact, and a wiring metal and the directional information on the source, channel, and drain of the silicon island and driving a laser, mirror, slit, and stage. Optimizing algorithms such as a linear programming method, branch and bound method, neuron circuit network, and annealing method are present in a specific optimizing method. An optimizing algorithm slightly depends on a device to be driven. However, any one of algorithms is effective for this laser system and it is enough to select one of the algorithms. It is important to perform optimization in order to minimize the time required for all works.

Figure 11:
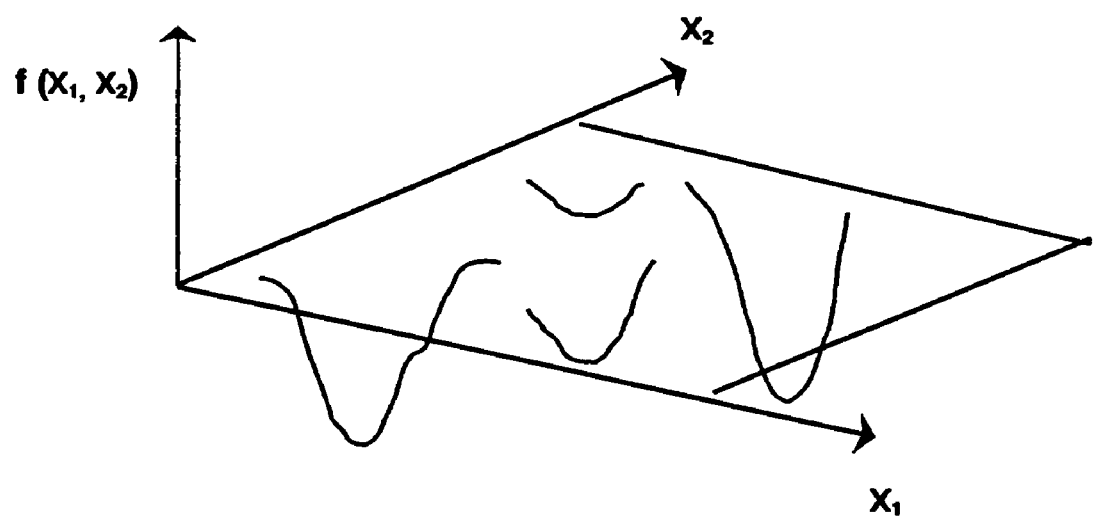
FIG. 11 is a schema of a function optimizing question.

When mathematically schematizing optimization, even a function optimizing question becomes a question for obtaining a point providing the minimum value of the height $(\times 1, \times 2)$ decided by axes $\times 1$ and $\times 2$, that is, coordinates of the vertex of the lowest valley in the case of two variables as shown in FIG. 11.

Figure 12:
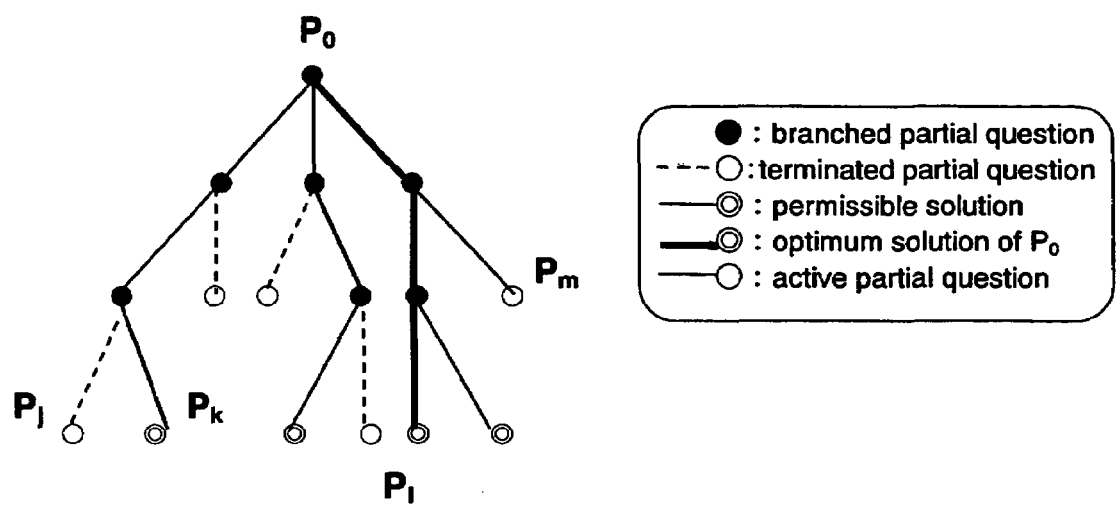
FIG. 12 a solving-method image according to a branch and bound method.

FIG. 12 shows a schematic view of a solution by the branch and bound method as one of optimizing algorithms. As the basic idea of the branch and bound method, a provided question PO is first decomposed to a plurality of partial questions (Pj, Pk, Pl, and Pm). A tree showing a process for sequentially branching a provided question to partial questions is referred to as a branch diagram. Then, partial questions are terminated by any method. In the case of this diagram, the partial question Pj is terminated because it does not have any permissible solution and Pk is terminated after the optimum solution of Pk is obtained. Moreover, the optimum solution of PO is found by Pl and processing is completed.

Figure 13:
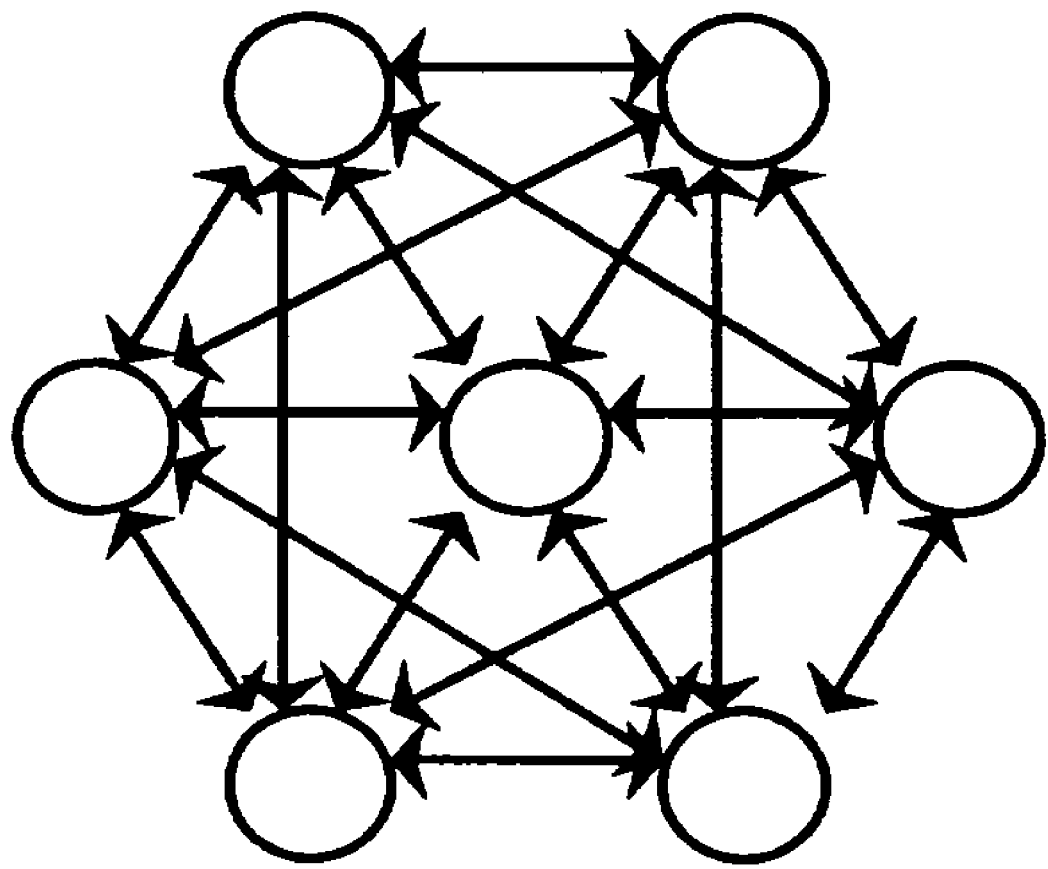
FIG. 13 is a schema of an interconnecting neuron-circuit network.
Figure 14:
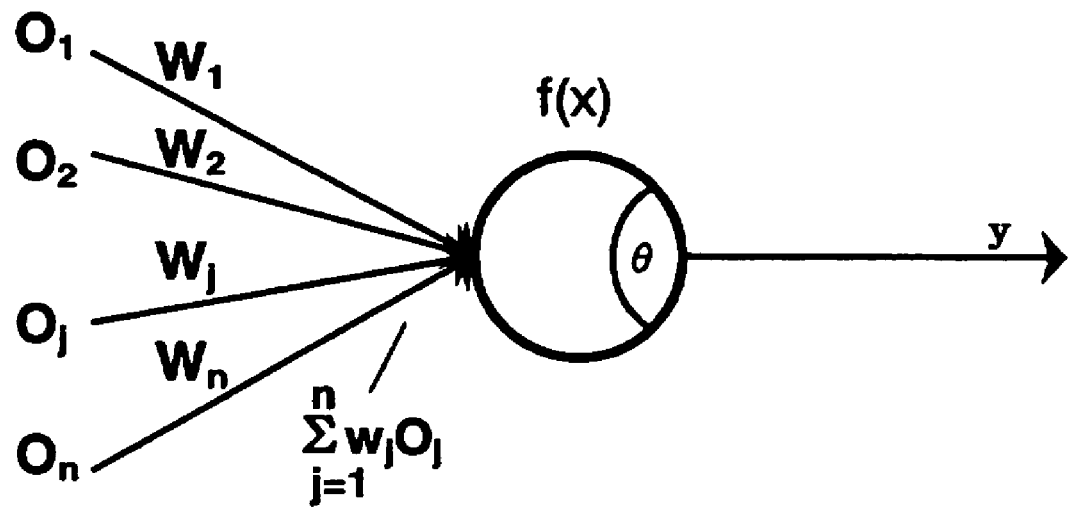
FIG. 14 is an operation unit corresponding to a neuron cell used for a neuron circuit network.

In general, the annealing method represented by a Boltzmann machine is used as the optimum algorithm. However, a method using a neuron circuit network is described below. Though the neuron circuit network includes several types, an interconnecting neuron circuit network represented by Hopfield network is frequently used to handle an optimization question. FIG. 13 shows a schematic view of the interconnecting neuron circuit network. Transfer of signals between nodes expressed by symbol O in FIG. 13 is constituted by an operation unit corresponding to the nerve cell shown in FIG. 14 and there is the relation shown in FIG. 15 between an input signal x and an output signal y of the unit. In this case, it is assumed that signals output from n other units outputting signals to a noticed unit is 0j (1<j<n), the combination weight between the n units and the noticed unit is wj (1<j<n), and the threshold value of the noticed unit is θ. The solving method is equivalent to the case of obtaining a stable solution shown in FIG. 11.

It is important to execute this example by combining it with the example 1.

Example 3

In the case of operations by an optimizing section, it is important to sufficiently consider the speed of a drive, the time required to change a drive to a different drive, and the time required from generation of a driving command up to actual driving when driving a laser, mirror, slit, and stage. When constituting software, it is necessary to sufficiently comprehend the scale for these times. Therefore, the processing time by an actual driving system is described below.

Figure 15:
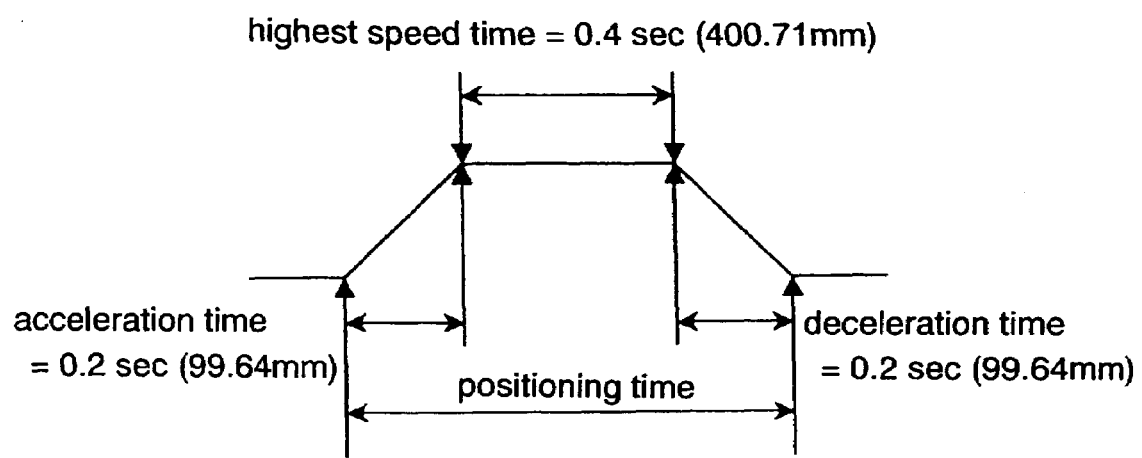
FIG. 15 is a moving-time schema of a major-axis stage.

A stage moving in x and y directions indispensable for scanning for deciding a position to be irradiated by a laser is one of important drives. The moving speed of the stage ranges between several and thousands of mm/sec. In fact, however, an acceleration period is present from the start of driving the stage up to reaching a certain speed and a deceleration period is present up to end of driving the stage. The acceleration-deceleration time of the acceleration period and deceleration period is decided in accordance with a carrying mass and a moving distance. For example, the time when a carrying mass is 100 kg, a moving distance is 600 mm, and a speed is 1,000 mm/sec is estimated as shown in FIG. 15 that is, the acceleration time results in 0.2 sec, the highest-speed time results in 0.4 sec, and the deceleration time results in 0.2 sec. A positioning time is obtained by adding the acceleration time, highest-speed time, and deceleration time.

Figure 16:
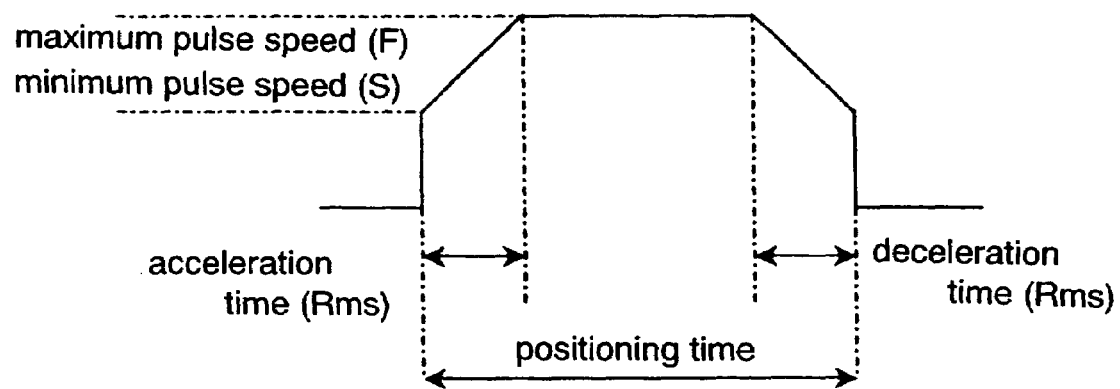
FIG. 16 is acceleration and deceleration patterns.

Moreover, when forming silicon islands different from each other in source and drain directions on the same substrate, a stage is rotated to change directions of the substrate. In this case, though the rotational speed of the stage ranges between tens and thousands of degree/see, acceleration and deceleration patterns are shown as FIG. 16. Because acceleration time and deceleration time are present also in the rotation of the stage, it is necessary to consider the acceleration time and deceleration time.

Furthermore, it may be necessary to estimate a driving command and actual driving time. This is because a command transfer speed may remarkably appear when a driving speed is high enough. As a simple operation example, FIG. 17 shows a case of repeating operations of moving the major axis by +600 mm, minor axis by +100 μm, major axis by −600 mm, and minor axis by +100 μm. First, when an operation starts, a start signal is sent to open each port. To open each port, a period of approx. hundreds of milliseconds is necessary. Then, after alignment (requires several minutes), a command for setting an angle is transmitted and the angle moves by 90°. The speed for transmitting the command corresponds to the above-described command transfer speed. The time required for transmission of the command is 9 msec or more and the time required to move by 90° is approx. several seconds.

It is important to consider this example by combining it with the example 1 or 2.

In the case of the present invention, at least an indispensable portion is scanned with a laser beam so that it can be crystallized instead of scanning and irradiating the whole semiconductor film with the laser beam by driving a laser, mirror, slit, and stage in accordance with the position of a silicon island extracted from a combination of CAD masks of the silicon island, a contact, and a wiring metal, the shape and size of the silicon island, and directional information on the source, channel, and drain of the silicon island. The above configuration makes it possible to omit the time for irradiating a portion to be removed through patterning after crystallizing the semiconductor film with a laser beam and greatly shorten the treatment time for one substrate.

What is claimed is:

1. A laser treatment system comprising:
   means for inputting information on Computer Aided Design masks for a formation of a thin film transistor including a silicon island, a contact hole, and a wiring metal over a substrate by a person;

means for automatically extracting positional and directional information for irradiating a laser beam over the substrate provided with a marker in accordance with the information on the Computer Aided Design masks for the formation of thin film transistor;

means for obtaining an optimum driving condition of a laser system in accordance with the positional and directional information; and means for controlling the laser system in accordance with the optimum driving condition of the laser system, wherein a position to be scanned with the laser beam is controlled in accordance with the Computer Aided Design masks on the basis of a position of the marker.

2. The laser treatment system according to claim 1, wherein the optimum driving condition of the laser system is obtained by using one of optimization algorithm among a linear programming method, branch and bound method, neuron circuit network, and annealing method.

3. The laser treatment system according to claim 1, wherein the optimum driving condition of the laser system is obtained by using an evolutionary technique represented by a genetic algorithm.

4. A computer-readable recording medium storing a program of the laser treatment system of claim 1.

5. The laser treatment system according to claim 1, the laser beam is irradiated over the substrate for crystallization.

6. A laser treatment system comprising:

means for inputting information on Computer Aided Design masks for a formation of a thin film transistor including a silicon island, a contact hole, and a wiring metal over a substrate by a person;

means for automatically extracting positional and directional information for irradiating a laser beam over the substrate provided with a marker in accordance with the information on the Computer Aided Design masks for the formation of thin film transistor and storing the positional and directional information in a database;

means for obtaining an optimum driving condition of a laser system in accordance with the positional and directional information stored in the database; and means for controlling the laser system in accordance with the optimum driving condition of the laser system, wherein a position to be scanned with the laser beam is controlled in accordance with the Computer Aided Design masks on the basis of a position of the marker.

7. The laser treatment system according to claim 6, wherein the optimum driving condition of the laser system is obtained by using one of optimization algorithm among a linear programming method, branch and bound method, neuron circuit network, and annealing method.

8. The laser treatment system according to claim 6, wherein the optimum driving condition of the laser system is obtained by using an evolutionary technique represented by a genetic algorithm.

9. A computer-readable recording medium storing a program of the laser treatment system of claim 6.

10. The laser treatment system according to claim 6, the laser beam is irradiated over the substrate for crystallization.

11. A laser treatment system comprising:

means for inputting information on Computer Aided Design masks for a formation of a thin film transistor including a silicon island, a contact hole, and a wiring metal over a substrate by a person;

means for automatically extracting positional and directional information for irradiating a laser beam over the substrate provided with a marker in accordance with the information on the Computer Aided Design masks for the formation of thin film transistor and storing the positional and directional information in a database;

means for obtaining an optimum driving condition of a laser system for minimizing laser treatment time by considering speed of drive of the laser system and time required for changing drives of the laser system in accordance with the positional and directional information stored in the database; and means for controlling the laser system in accordance with the optimum driving condition of the laser system, wherein a position to be scanned with the laser beam is controlled in accordance with the Computer Aided Design masks on the basis of a position of the marker.

12. The laser treatment system according to claim 11, wherein the optimum driving condition of the laser system is obtained by using one of optimization algorithm among a linear programming method, branch and bound method, neuron circuit network, and annealing method.

13. The laser treatment system according to claim 11, wherein the optimum driving condition of the laser system is obtained by using an evolution-theoretical technique represented by a genetic algorithm.

14. A computer-readable recording medium storing a program of the laser treatment system of claim 11.

15. The laser treatment system according to claim 11, the laser beam is irradiated over the substrate for crystallization.

16. A laser treatment system comprising:

means for inputting information on Computer Aided Design masks for a formation of a thin film transistor including a silicon island, a contact hole, and a wiring metal over a substrate by a person;

means for automatically extracting positional and directional information for irradiating a laser beam over the substrate provided with a marker in accordance with the information on the Computer Aided Design masks for the formation of thin film transistor and storing the positional and directional information in a database;

means for obtaining an optimum driving condition of a laser system for minimizing laser treatment time by considering speed of drive of the laser system, time required for changing drives of the laser system, and time required for starting actual driving after generating a driving command in accordance with the positional and directional information stored in the database; and means for controlling the laser system in accordance with the optimum driving condition of the laser system, wherein a position to be scanned with the laser beam is controlled in accordance with the Computer Aided Design masks on the basis of a position of the marker.

17. The laser treatment system according to claim 16, wherein the optimum driving condition of the laser system is obtained by using one of optimization algorithm among a linear programming method, branch and bound method, neuron circuit network, and annealing method.

18. The laser treatment system according to claim 16, wherein the optimum driving condition of the laser system is obtained by using an evolution-theoretical technique represented by a genetic algorithm.

19. A computer-readable recording medium storing a program of the laser treatment system of claim 16.

20. The laser treatment system according to claim 16, the laser beam is irradiated over the substrate for crystallization.

21. A laser treatment system comprising:

means for inputting information on Computer Aided Design masks for a formation of a thin film transistor including a silicon island, a contact hole, and a wiring metal over a substrate by a person;

means for automatically extracting positional and directional information for irradiating a laser beam over the substrate provided with a marker in accordance with the information on the Computer Aided Design masks for the formation of thin film transistor;

means for obtaining an optimum driving condition of a laser system for minimizing laser treatment time by considering speed of drive of the laser system and time required for changing drives of the laser system in accordance with the positional and directional information; and means for controlling the laser system in accordance with the optimum driving condition of the laser system, wherein a position to be scanned with the laser beam is controlled in accordance with the Computer Aided Design masks on the basis of a position of the marker.

22. The laser treatment system according to claim 21, wherein the optimum driving condition of the laser system is obtained by using one of optimization algorithm among a linear programming method, branch and bound method, neuron circuit network, and annealing method.

23. The laser treatment system according to claim 21, wherein the optimum driving condition of the laser system is obtained by using an evolution-theoretical technique represented by a genetic algorithm.

24. A computer-readable recording medium storing a program of the laser treatment system of claim 21.

25. The laser treatment system according to claim 21, the laser beam is irradiated over the substrate for crystallization.

* * * * *